(12) United States Patent
Emigh et al.

(10) Patent No.: US 9,026,597 B1
(45) Date of Patent: May 5, 2015

(54) MESSAGING ENHANCEMENTS

(75) Inventors: Aaron T. Emigh, Incline Village, NV (US); James A. Roskind, Redwood City, NV (US)

(73) Assignee: Radix Holdings, LLC, Incline Village, NV (US)

( * ) Notice: Subject to any disclaimer, the term of this patent is extended or adjusted under 35 U.S.C. 154(b) by 2798 days.

(21) Appl. No.: 10/984,435

(22) Filed: Nov. 8, 2004

Related U.S. Application Data

(60) Provisional application No. 60/518,382, filed on Nov. 7, 2003, provisional application No. 60/524,107, filed on Nov. 22, 2003, provisional application No. 60/535,421, filed on Jan. 9, 2004.

(51) Int. Cl.
*G06F 15/16* (2006.01)
*H04L 1/16* (2006.01)

(52) U.S. Cl.
CPC .................................. *H04L 1/1635* (2013.01)

(58) Field of Classification Search
USPC .......... 709/206, 220; 726/2, 22; 370/352, 254
See application file for complete search history.

(56) References Cited

U.S. PATENT DOCUMENTS

| | | | |
|---|---|---|---|
| 6,405,243 B1 * | 6/2002 | Nielsen | 709/206 |
| 6,644,779 B2 * | 11/2003 | Aldrich et al. | 347/36 |
| 6,654,779 B1 * | 11/2003 | Tsuei | 718/101 |
| 7,096,498 B2 * | 8/2006 | Judge | 726/22 |
| 7,120,927 B1 * | 10/2006 | Beyda et al. | 726/2 |
| 2003/0018722 A1 * | 1/2003 | Almeda et al. | 709/206 |
| 2003/0091167 A1 * | 5/2003 | Hirai | 379/93.01 |
| 2003/0167402 A1 * | 9/2003 | Stolfo et al. | 713/200 |
| 2004/0246517 A1 * | 12/2004 | Parry | 358/1.15 |
| 2004/0258004 A1 * | 12/2004 | Brocke et al. | 370/254 |
| 2004/0258044 A1 * | 12/2004 | Girouard et al. | 370/352 |
| 2005/0033810 A1 * | 2/2005 | Malcolm | 709/206 |
| 2005/0076084 A1 * | 4/2005 | Loughmiller et al. | 709/206 |
| 2005/0091320 A1 * | 4/2005 | Kirsch et al. | 709/206 |

* cited by examiner

*Primary Examiner* — Tammy Nguyen

(57) ABSTRACT

In some embodiments, techniques for electronic messages may include various enhancements.

20 Claims, 31 Drawing Sheets

| ! | ⌐ | Score | From | Subject | Received | ▲ |
|---|---|---|---|---|---|---|
| | ✉ | 67 | Charlotte J. W... | Monday Call at 11am | Fri 10/10/2003 2:... | |
| | ✉ | 83 | Now us girls ca... | have our own excusive place to s hop1 | Fri 10/10/2003 11... | |
| | ✉ | 84 | Your pass | do you want more than you have? | Fri 10/10/2003 11... | |
| ↓ | ✉ | 88 | Ugene | You're a Quitter oagwopef mpt | Fri 10/10/2003 10... | |
| | ✉ | 92 | Erma | Re: the goodnatured nurse f | Fri 10/10/2003 8:... | |
| | ✉ | 96 | klklpkl@yahoo.... | Tired of the Cable Bill?    barren spot, and a poo | Fri 10/10/2003 7:... | |
| | ✉ | 97 | Hall | -eBay f,or ;great inco"me poten=tial ux,gbfjgl | Fri 10/10/2003 7:... | |
| | ✉ | 98 | ikwal scheitor | ZS going to the ddrugstore? vsw | Fri 10/10/2003 3:... | ▼ |

Figure 4

```
From recipient@recipient.com  Wed Oct  1 14:50:40 2003
Return-Path: <recipient@recipient.com>
Received: from host97.ipowerweb.com (host97.ipowerweb.com
[12.129.229.197])
        by sender.com (8.12.5/8.12.5) with SMTP id h91LodHq019642
        for <sender@sender.com>; Wed, 1 Oct 2003 14:50:39 -0700 (PDT)
Received: (qmail 98241 invoked from network); 1 Oct 2003 21:51:09 -0000
Received: from unknown (HELO recipientmachine) (63.205.185.188)
   by 0 with SMTP; 1 Oct 2003 21:51:09 -0000
From: "Robert Recipient" <recipient@recipient.com>
To: "Steve Sender" <sender@sender.com>
Subject: REQUEST FOR ALIASES FROM ROBERT RECIPIENT
Date: Wed, 1 Oct 2003 14:49:15 -0700
Message-ID: <008501c38865$db7e0750$0300a8c0@recipientmachine>
MIME-Version: 1.0
Content-Type: text/plain;
        charset="iso-8859-1"
Content-Transfer-Encoding: 7bit
X-Priority: 3 (Normal)
X-MSMail-Priority: Normal
X-Mailer: Microsoft Outlook IMO, Build 9.0.2416 (9.0.2911.0)          ── 1102
In-Reply-To: <200310012137.h91Lb4e2019444@sender.com>
Importance: Normal
X-MimeOLE: Produced By Microsoft MimeOLE V6.00.2800.1106
X-Alias-Request: sender@sender.com                                    ── 1103
Content-Length: 208                           ── 1101

This is an automated request for aliases.  If you are seeing this
message, it is the result of a mailer that does not support alias
management.  To obtain alias software that will allow your
correspondents to recognize your email from all your accounts, please
visit http://www.aliasmanagementsoftware.com.
```

Figure 11

```
From sender@sender.com  Wed Oct  1 14:50:40 2003
Return-Path: <recipient@recipient.com>
Received: from host97.ipowerweb.com (host97.ipowerweb.com
[12.129.229.197])
       by recipient.com (8.12.5/8.12.5) with SMTP id h91LodHq019642
       for <recipient@recipient.com>; Wed, 1 Oct 2003 14:50:39 -0700 (PDT
Received: (qmail 98241 invoked from network); 1 Oct 2003 21:51:09 -0000
Received: from unknown (HELO sendermachine) (63.205.185.188)
   by 0 with SMTP; 1 Oct 2003 21:51:09 -0000
From: "Steve Sender" <sender@sender.com>
To: "Robert Recipient" <recipient@recipient.com>
Subject: DELETE THIS MESSAGE
Date: Wed, 1 Oct 2003 14:49:15 -0700
Message-ID: <200310012137.h91Lb4e2019444@sender.com>
MIME-Version: 1.0
Content-Type: text/plain;
       charset="iso-8859-1"
Content-Transfer-Encoding: 7bit
X-Priority: 3 (Normal)            ── 1201
X-MSMail-Priority: Bulk                                              ── 1202
X-Mailer: Microsoft Outlook IMO, Build 9.0.2416 (9.0.2911.0)
In-Reply-To: <008501c38865$db7e0750$0300a8c0@recipientmachine>
Importance: Normal
X-MimeOLE: Produced By Microsoft MimeOLE V6.00.2800.1106   ── 1203
X-Aliases: ssender@work.com, anonymous@hotmail.com
Content-Length: 122

You may ignore this message and should delete it.
                                                    ── 1204
```

Figure 12

```
From sender@sender.com  Wed Oct  1 14:50:40 2003
Return-Path: <recipient@recipient.com>
Received: from host97.ipowerweb.com (host97.ipowerweb.com
[12.129.229.197])
      by recipient.com (8.12.5/8.12.5) with SMTP id h91LodHq019642
      for <recipient@recipient.com>; Wed, 1 Oct 2003 14:50:39 -0700 (PDT
Received: (qmail 98241 invoked from network); 1 Oct 2003 21:51:09 -0000
Received: from unknown (HELO sendermachine) (63.205.185.188)
   by 0 with SMTP; 1 Oct 2003 21:51:09 -0000
From: "Steve Sender" <sender@sender.com>
To: "Robert Recipient" <recipient@recipient.com>
Subject: Hi there!
Date: Wed, 1 Oct 2003 14:49:15 -0700
Message-ID: <008501c38865$db7e0750$0300a8c0@sendermachine>
MIME-Version: 1.0
Content-Type: text/plain;
      charset="iso-8859-1"
Content-Transfer-Encoding: 7bit
X-Priority: 3 (Normal)
X-MSMail-Priority: Normal
X-Mailer: Microsoft Outlook IMO, Build 9.0.2416 (9.0.2911.0)
Importance: Normal
X-MimeOLE: Produced By Microsoft MimeOLE V6.00.2800.1106 ───── 1301
X-Aliases: ssender@work.com, anonymous@hotmail.com ───── 1302
X-Alias-Certificate: MIIBvzCCASgCAQAwfzELMAkGA1UEBhMCVUsxDD
      AKBgNVBAgTA24vYTEPMA0GA1UEBxMGTG9uZG9uMQwwCgYDVQQKEwNuL2ExJjAkBg
      NVBAsTHWh0dHA6Ly93d3cuY21sY29uc3VsdGluZy5jb20vMRswGQYDVQQDExJDTU
      wgQ29uc3VsdGluZyBMdGQwgZ8wDQYJKoZIhvcNAQEBBQADgY0AMIGJAoGBAJ2Kr7
      /yB1J2YqwBBQ9STY1haO2t2n/B6SvFigruSg3/bkMGKDHI/v/EYaUxPKpyc4lk+q
      Lwx/A/AXh1fpcoIoMR5nIyVX/9Ka3J5fvNpWRz3FGo/fyUyEGBjZW9umZJcV2HCv
      yHQiltfKYHKWr3MenFe8G24M2WezRAWqGxShsdAgMBAAGgADANBgkqhkiG9w0BAQ
      QFAAOBgQBC0Hsv1tLE6p2HwoIrRl+1tBNp8RgfD9hQJtX8691qTIamWNRXCqKtr2
      UVg4c4yDq3c8MfSUuebk9S6sVF87GeQwnwE6dzav+FtNli94671E8qhTit1TZ86C
      uj7XvuK3nyTORxxIzCTek+kVrEnbGDDwf71duKBUS9MvJqvOCMgg==
X-COA-Token: ke82hd9sjk3un8x+2kd8co2fum8+duem
X-Address-Change-Fingerprint: 0E2AB235019B5C582D52059A3D9B84DB
X-COA-Authority: addresschangenotify.com
Content-Length: 122                                    ───── 1303      ───── 1304

Rob --                                  ───── 1305

It's been a long time.  Are you coming to the next meeting of the Save
the Skeet Society?

Yours,
Steve Sender                                                    ───── 1306
```

Figure 13

```
From sender@sender.com  Wed Oct  1 14:50:40 2003
Return-Path: <recipient@recipient.com>
Received: from host97.ipowerweb.com (host97.ipowerweb.com
[12.129.229.197])
      by recipient.com (8.12.5/8.12.5) with SMTP id h91LodHq019642
      for <recipient@recipient.com>; Wed, 1 Oct 2003 14:50:39 -0700 (PDT)
Received: (qmail 98241 invoked from network); 1 Oct 2003 21:51:09 -0000
Received: from unknown (HELO sendermachine) (63.205.185.188)
   by 0 with SMTP; 1 Oct 2003 21:51:09 -0000
From: "Steve Sender" <sender@sender.com>
To: "Robert Recipient" <recipient@recipient.com>
Subject: Change of email address
Date: Wed, 1 Oct 2003 14:49:15 -0700
Message-ID: <008501c38865$db7e0750$0300a8c0@sendermachine>
MIME-Version: 1.0
Content-Type: text/plain;
      charset="iso-8859-1"
Content-Transfer-Encoding: 7bit
X-Priority: 3 (Normal)
X-MSMail-Priority: Normal                                               1901
X-Mailer: Microsoft Outlook IMO, Build 9.0.2416 (9.0.2911.0)
Importance: Normal
X-MimeOLE: Produced By Microsoft MimeOLE V6.00.2800.1106
X-Address-Change: ke82hd9sjk3un8x+2kd8co2fum8+duem, sender@sender.com,
      new@new.com
Content-Length: 122      1902          1903
                    1904

This is an address change notification for Steve Sender.  I am changing
my email address from sender@sender.com to new@new.com.  Please update
your records.
                                                                  1905

Did you know that these address changes can be processed automatically,
without ever having to modify your records or even see emails like this
one?  For details, please visit www.changeofaddresssoftware.com.
                                                                  1906
Yours,
Steve Sender
```

Figure 19

```
                              2001
From coa@addresschangenotify.com  Wed Oct  1 14:50:40 2003
Return-Path: <recipient@recipient.com>
Received: from host97.ipowerweb.com (host97.ipowerweb.com
[12.129.229.197])
     by recipient.com (8.12.5/8.12.5) with SMTP id h91LodHq019642
     for <recipient@recipient.com>; Wed, 1 Oct 2003 14:50:39 -0700 (PDT
Received: (qmail 98241 invoked from network); 1 Oct 2003 21:51:09 -0000
Received: from unknown (HELO addrchange) (63.205.185.188)
   by 0 with SMTP; 1 Oct 2003 21:51:09 -0000
From: "Change of Address Notification" <coa@addresschangenotify.com>
To: "Robert Recipient" <recipient@recipient.com>
Subject: Change of email address for Steve Sender
Date: Wed, 1 Oct 2003 14:49:15 -0700
Message-ID: <008501c38865$db7e0750$0300a8c0@addrchange>
MIME-Version: 1.0
Content-Type: text/plain;
     charset="iso-8859-1"
Content-Transfer-Encoding: 7bit
X-Priority: 3 (Normal)
X-MSMail-Priority: Normal                                         2002
X-Mailer: Microsoft Outlook IMO, Build 9.0.2416 (9.0.2911.0)
Importance: Normal
X-MimeOLE: Produced By Microsoft MimeOLE V6.00.2800.1106
X-Address-Change: otguhero8ytw9h34uyt0tfedgy2364rtof9y34pthpoert987wer2
Content-Length: 122

This is an address change notification for Steve Sender.  Steve is
changing his email address from sender@sender.com to new@new.com.
Please update your records.
                                                                  2003
Did you know that these address changes can be processed automatically,
without ever having to modify your records or even see emails like this
one?  You can also manage all of your address changes automatically, so
your friends will always be up to date.  For details, please visit
www.changeofaddresssoftware.com.
                                                                  2004
Yours,
Steve Sender
```

Figure 20

```
From sender@sender.com  Wed Oct  1 14:50:40 2003
Return-Path: <recipient@recipient.com>
Received: from host97.ipowerweb.com (host97.ipowerweb.com
[12.129.229.197])
     by recipient.com (8.12.5/8.12.5) with SMTP id h91LodHq019642
     for <recipient@recipient.com>; Wed, 1 Oct 2003 14:50:39 -0700 (PDT)
Received: (qmail 98241 invoked from network); 1 Oct 2003 21:51:09 -0000
Received: from unknown (HELO sendermachine) (63.205.185.188)
   by 0 with SMTP; 1 Oct 2003 21:51:09 -0000
From: "Steve Sender" <sender@sender.com>
To: "Robert Recipient" <recipient@recipient.com>
Subject: Change of email address
Date: Wed, 1 Oct 2003 14:49:15 -0700
Message-ID: <008501c38865$db7e0750$0300a8c0@sendermachine>
MIME-Version: 1.0
Content-Type: text/plain;
     charset="iso-8859-1"
Content-Transfer-Encoding: 7bit
X-Priority: 3 (Normal)
X-MSMail-Priority: Normal
X-Mailer: Microsoft Outlook IMO, Build 9.0.2416 (9.0.2911.0)         ╱─ 2101
Importance: Normal
X-MimeOLE: Produced By Microsoft MimeOLE V6.00.2800.1106
X-Address-Change-Key:
     mQCNAi5NXZ4AAAEEALdbG6q7RQMnQyWoVJnCeChHG7Mnw2EQCw76idzU0vY8o1L0
     WkRmSnK+Cm91hach1jaOuqnle67WyNlfpi4mPXx7YrK3y2nM3O5FnL5rc4+/Oomy
     jSt+ap8tLgH1NPz72UfLDAQ4eZs6W7drqMLkaooR3O6fxDvP+2SgIEAkDWz1AAUR
     tB5KaW0gUm9za21uZCA8amFyQG51dHNjYXBlLmNvbT60HkppbSBSb3NraW5kIDxq
     YXJAaW5mb3N1ZWsuY29tPg===HRY/
X-Address-Change: 4ir2d230s+3cdiso31+23scsd3o2p
Content-Length: 122                              ─── 2102

This is an address change notification for Steve Sender.  I am changing
my email address from sender@sender.com to new@new.com.  Please update
your records.
                                                 ─── 2103
Did you know that these address changes can be processed automatically,
without ever having to modify your records or even see emails like this
one?  For details, please visit www.changeofaddresssoftware.com.

Yours,
Steve Sender                                     ─── 2104
```

MESSAGING ENHANCEMENTS

CROSS REFERENCE TO OTHER APPLICATIONS

This application claims priority to U.S. Provisional Patent Application No. 60/518,382, entitled Electronic Messaging Enhancements, filed Nov. 7, 2003, which is incorporated herein by reference for all purposes.

This application claims priority to U.S. Provisional Patent Application No. 60/524,107, entitled Additional Messaging Enhancements, filed Nov. 22, 2003, which is incorporated herein by reference for all purposes.

This application claims priority to U.S. Provisional Patent Application No. 60/535,421, entitled Implicit Spam Detection, filed Jan. 9, 2004, which is incorporated herein by reference for all purposes.

FIELD OF THE INVENTION

The present invention relates generally to the area of computer software, more specifically to electronic messaging.

BACKGROUND OF THE INVENTION

Electronic messages such as email, SMS text messages and instant messages are commonly used for personal and business communications. Current approaches to electronic messaging suffer from a variety of shortcomings, including unreliable delivery, cumbersome addressing of messages, difficulty in determining when a message has been received and/or read, inaccessibility of encrypted messages after cryptographic keys have changed, difficulty managing addresses of correspondents in the presence of aliases or changes of address, limitations on the configurability of correspondence options, difficulty determining recipients of messages, and difficulty in managing spam-related messaging features such as whitelists and quarantine folders.

Accordingly, it would be useful to have improved techniques for electronic messaging.

BRIEF DESCRIPTION OF THE DRAWINGS

Various embodiments of the invention are disclosed in the following detailed description and the accompanying drawings.

FIG. 4 is an example of sorting messages by a spam assessment rating, such as shown in FIG. 3, according to some embodiments.

FIG. 11 is an example of an alias request message, such as described in conjunction with 903 of FIG. 9, according to some embodiments.

FIG. 12 is an example of a response to an alias request message, such as described in conjunction with 903 of FIG. 9, according to some embodiments.

FIG. 13 is an example of an email message containing information associated with aliases and change of address, according to some embodiments.

FIG. 19 is an example of a token-authenticated change-of-address directive, according to some embodiments.

FIG. 20 is an example of an authority-authenticated change-of-address directive, according to some embodiments.

FIG. 21 is an example of a fingerprint-authenticated change-of-address directive, according to some embodiments.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
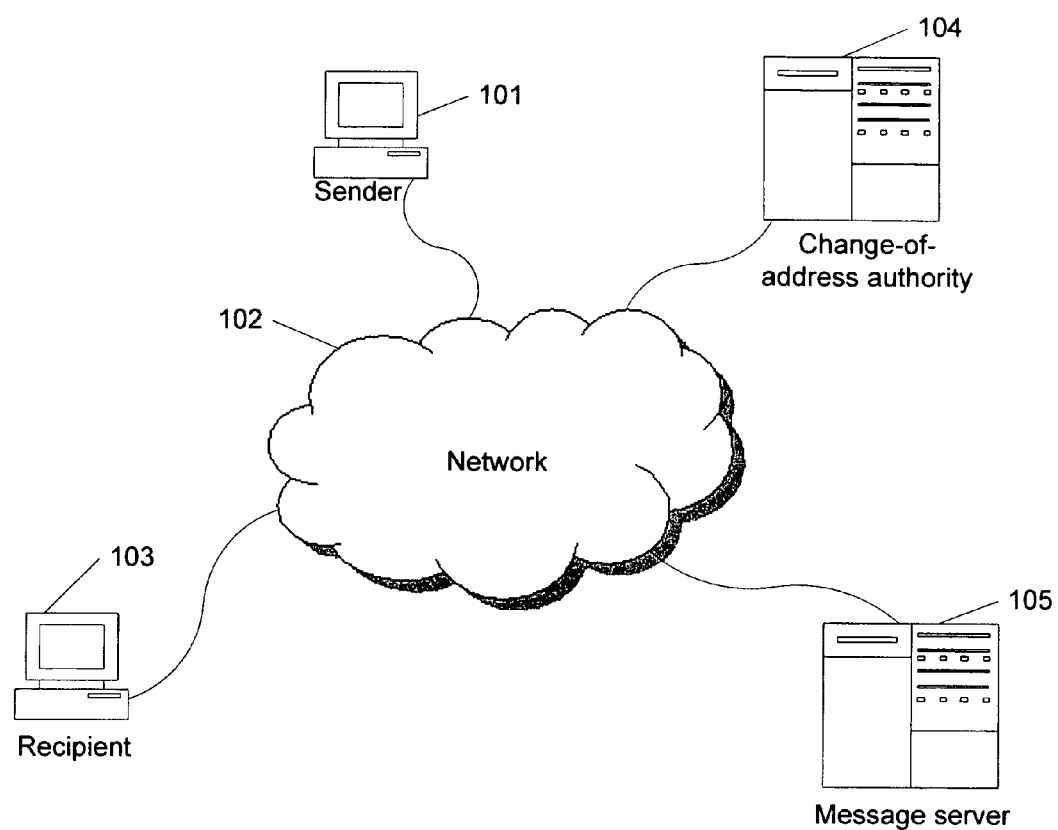
FIG. 1 is a diagram of a system for electronic messaging, according to some embodiments.

FIG. 1 is a diagram of a system for electronic messaging, according to some embodiments. In this example, a sender of a message 101 is connected to a network 102. A sender may be any device capable of sending a message, including a personal computer, PDA, or cell phone. A sender may also refer herein to a user of a device capable of sending a message, or a server receiving a message from a sender device. A message refers herein to any electronic communication that may be presented to a user. Examples of messages include email, instant messages, SMS text messages, RSS, Atom, and Bluetooth messages. The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network, such as a local area network connected to a public network such as the internet. A recipient of a message 103 may be connected to the network 102. A recipient may be any device capable of receiving a message, including a personal computer, PDA, or cell phone. A recipient may also refer herein to a user of a device capable of receiving a message, or a server transmitting a message to a recipient device.

In some embodiments, an optional change-of-address authority 104 may be connected to the network 102. The change-of-address authority 104 may provide services related to changes of messaging addresses. A message server 105, such as a Mail Transfer Agent (MTA) or POP or IMAP server, is connected to the network 102. In some embodiments, a message server 105 and recipient 103 may be within an enterprise network such as a LAN or virtual private network.

Figure 2:
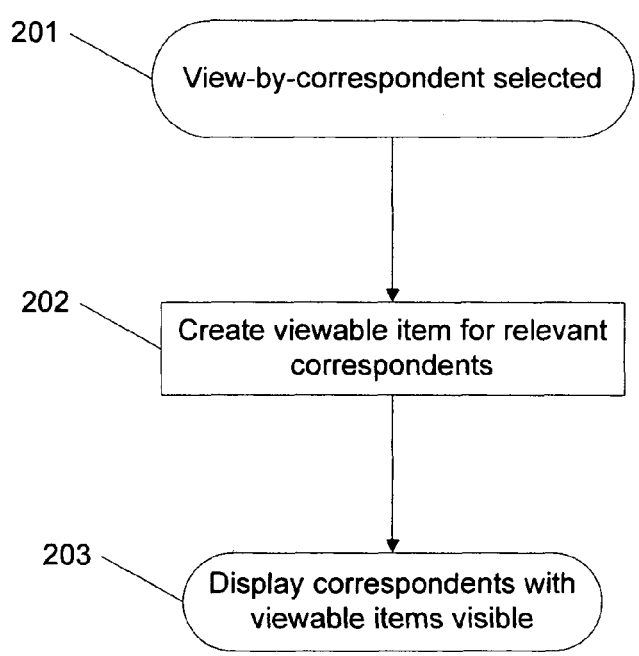
FIG. 2 is a flow diagram of a method for displaying messages associated with correspondents, according to some embodiments.

FIG. 2 is a flow diagram of a method for displaying messages associated with correspondents, according to some embodiments. In this example, a by-correspondent view may be selected (201). An example of a by-correspondent view is a view of an outgoing mail spool in which sorting is performed based on names of message recipients, which may for example be selected by a user selecting a "sent messages" folder and clicking on a field specification corresponding to message recipient names. A recipient name refers herein to a messaging address and/or a name associated with a messaging address. For example, the email recipient "Robert Recipient" <robert@recipient.com>' may contain, in various embodiments, the recipient names "Robert Recipient" and/or "Robert@recipient.com." A viewable item may be created for relevant correspondents (202). An example of creating a viewable item for a relevant correspondent is to examine a message with a recipient and create a viewable item showing characteristic information, such as a recipient, subject and date, corresponding to the message. An example of creating a viewable item for multiple relevant correspondents is to examine a message containing multiple recipient names and create a viewable item showing characteristic information, such as a recipient, subject and date, for each recipient name associated with the message. For example, an email addressed to john@foo.com, bob@foo.com, and paul@foo.com could result in the creation of three viewable items, identical in each detail except each with a different recipient shown, or with the recipient list shown in three different orders, one beginning with each recipient. Another example of creating a viewable item for multiple relevant correspondents is to create viewable items for multiple names associated with one or more recipients. An example of multiple names associated with a recipient is "Robert Recipient"<robert@recipient.com>'. In this example, separate viewable items may be created for both "Robert Recipient" and "Robert@recipient.com." In some embodiments, names may be permuted. An example of permuting names is to create three viewable items for "Robert Recipient"<robert@recipient.com>,' one for "Robert Recipient," one for "Recipient, Robert" and one for robert@recipient.com. In some embodiments, multiple viewable items corresponding to a single message may list multiple recipients in different orders, for example one beginning with each relevant recipient. In some embodiments, each message available for the selected view may be processed to create a viewable item for each permuted recipient name. In some embodiments, viewable items may be sorted by recipient. In some embodiments, recipients may include those to whom messages may have been sent with non-addressee mechanisms such as CC: or BCC: lines in an email. In some embodiments, multiple viewable items may be created for a single message in one view, such as sorting by recipient name, and a single viewable item may be created for a single message in another view, such as sorting by subject or date. Viewable items may be displayed (203), for example by presenting a scrollable list of the viewable items. In some embodiments, displaying viewable items may include auto-completion fields, for example typedown boxes wherein a user may type a name, and selectable possible completions for a partial name may be displayed. In such embodiments, possible completions may include multiple permuted names associated with a single message.

Figure 3:
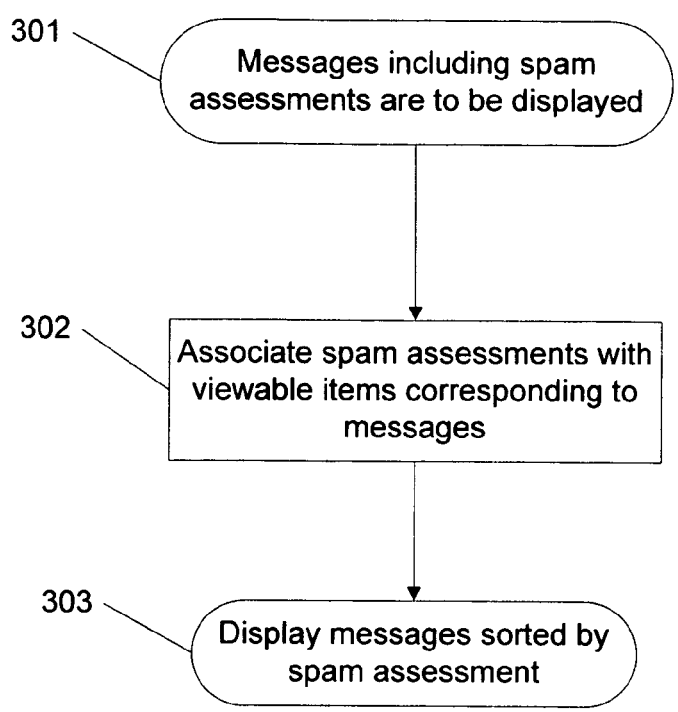
FIG. 3 is a flow diagram of a method for displaying messages with spam assessments, according to some embodiments.

FIG. 3 is a flow diagram of a method for displaying messages with spam assessments, according to some embodiments. In this example, a view is to be provided of messages with associated spam assessments (301). An example of providing a view of messages with associated spam assessments is responding to a user request to view a message folder containing messages suspected to be spam, such as a quarantine folder. A spam assessment refers herein to any metric providing an assessment of the likelihood that a message may be spam. Examples of spam assessments include absolute ratings such as percentage probabilities and fixed numeric scales from 1 to n (for example 1 to 10), relative ratings, and named categories. Spam assessments may be derived from any method(s) known to those skilled in the art, including content-based message filtering such as Bayesian filtering, envelope analysis, whitelists, blacklists, and combinations thereof. Spam assessments may optionally be associated with messages in viewable items (302). An example of associating a spam assessment with a message in a viewable item is to create a viewable item containing a spam assessment as well as other information characteristic of the message, such as the sender, subject and/or date. Viewable items corresponding to messages may be displayed, sorted by corresponding spam assessment ratings (303). In some embodiments, sorting by a spam assessment rating may be a sort criterion other than a primary sort criterion. An example of a sort criterion other than a primary sort criterion is a secondary sort criterion, for example sorting by date as a primary sort criterion, and within each similar date sorting by spam assessment rating as a secondary criterion.

FIG. 4 is an example of sorting messages by a spam assessment rating, such as shown in FIG. 3, according to some embodiments. In this example, a message view 401 is displayed, for example because a user has elected to view an email folder containing quarantined messages. The view includes a spam assessment rating 402. In this example, the spam assessment rating is a calculated percentage likelihood that a message is spam. Each viewable item corresponding to a message has an associated spam assessment rating 403, and the messages are sorted in this example by the spam assessment rating. In this example, messages determined less likely to be spam are displayed before messages determined more likely to be spam.

Figure 5:
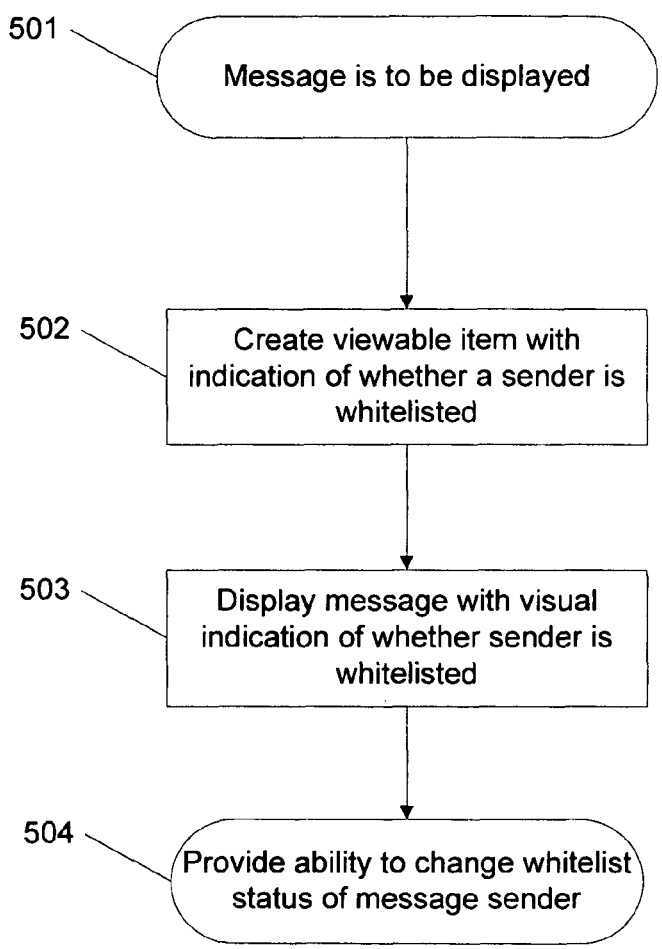
FIG. 5 is a flow diagram of a method for displaying a visual indication of a whitelisted message, according to some embodiments.

FIG. 5 is a flow diagram of a method for displaying a visual indication of a whitelisted message, according to some embodiments. In this example, a message is to be displayed (501), for example because the message is contained in an active message view such as an email inbox. A viewable item optionally may be created including a visual indication of whether the message is associated with a whitelisted sender (502). A whitelist refers herein to any mechanism by which some message senders may be given preferential treatment. Examples of whitelists include a list of senders whose messages are subjected to reduced scrutiny (including no scrutiny) by a spam filter, a global list of trusted senders such as members of a bonded sender program, and senders with whom a message recipient has previously corresponded. The message may be displayed including a visual indication of whether the message is associated with a whitelisted sender (503). Examples of a visual indication include using a symbol such as a check mark, color-coding such as using green for whitelisted senders and/or red for non-whitelisted senders, and/or displaying whitelist information in a properties dialog box. Optionally, the capability to change the whitelist status of a message, for example by whitelisting the sender of a message and/or removing the sender of a message from a whitelist, may be provided (504).

Figure 6:
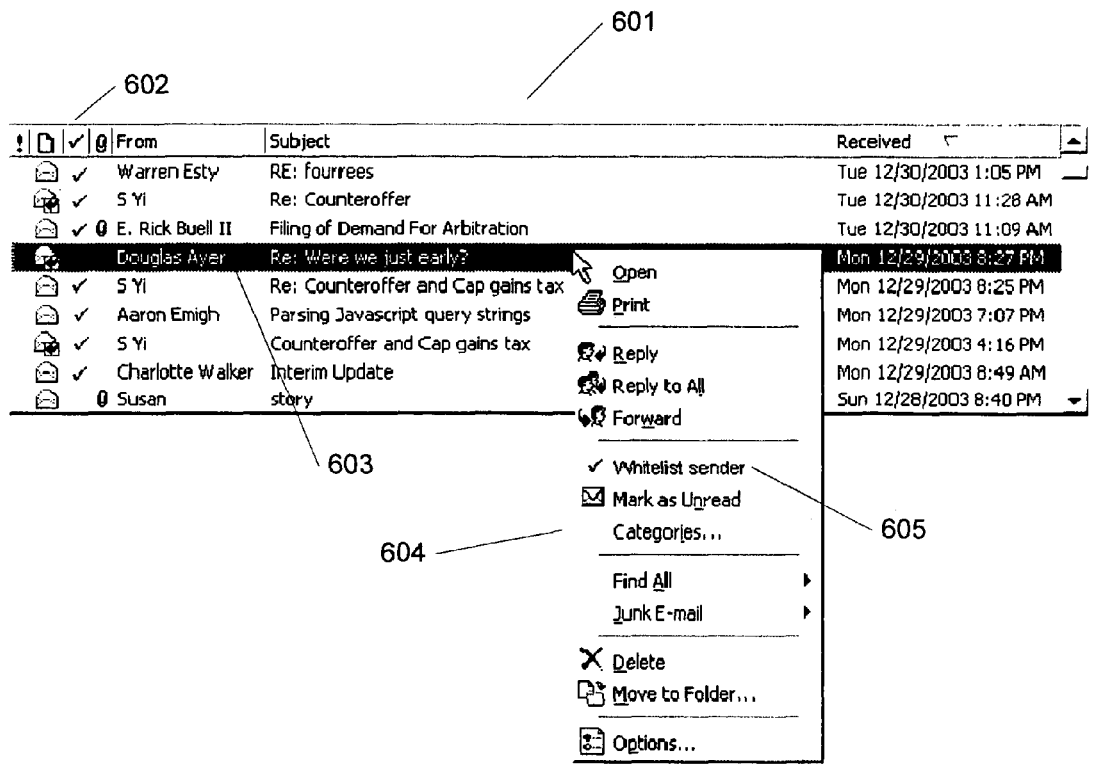
FIG. 6 is an example of displaying messages with a visual indication of associated whitelisted senders, such as shown in FIG. 5, according to some embodiments.

FIG. 6 is an example of displaying messages with a visual indication of associated whitelisted senders, such as shown in FIG. 5, according to some embodiments. In this example, a message view 601 is displayed, for example because a user has elected to view an email folder such as an inbox. A field 602 is provided for a visual indication of a whitelisted sender. In this example, a checkmark in the field 602 indicates that the sender is whitelisted, and the absence of a checkmark in the field 602 indicates that the sender is not whitelisted. In some embodiments, the field 602 may be a sortable field. An example of a sortable field is a field which may be selected to separate messages from whitelisted senders and messages from non-whitelisted senders. In some embodiments, a viewable item associated with a message 603 may be selected and whitelist-related aspects may be modified. In this example, selection has occurred by right-clicking on the viewable item 603 with a mouse. A menu 604 is displayed in this example, containing the option to whitelist the sender of the message 605 if the sender is not already whitelisted, or to remove the sender of the message from the whitelist if the sender is whitelisted. In another example, whitelist-related aspects of a message may be manipulated through other user interface elements. For example, the field 602 associated with a message may be manipulated, for example by clicking or double-clicking, to toggle the whitelisting status of a sender associated with the message.

Figure 7:
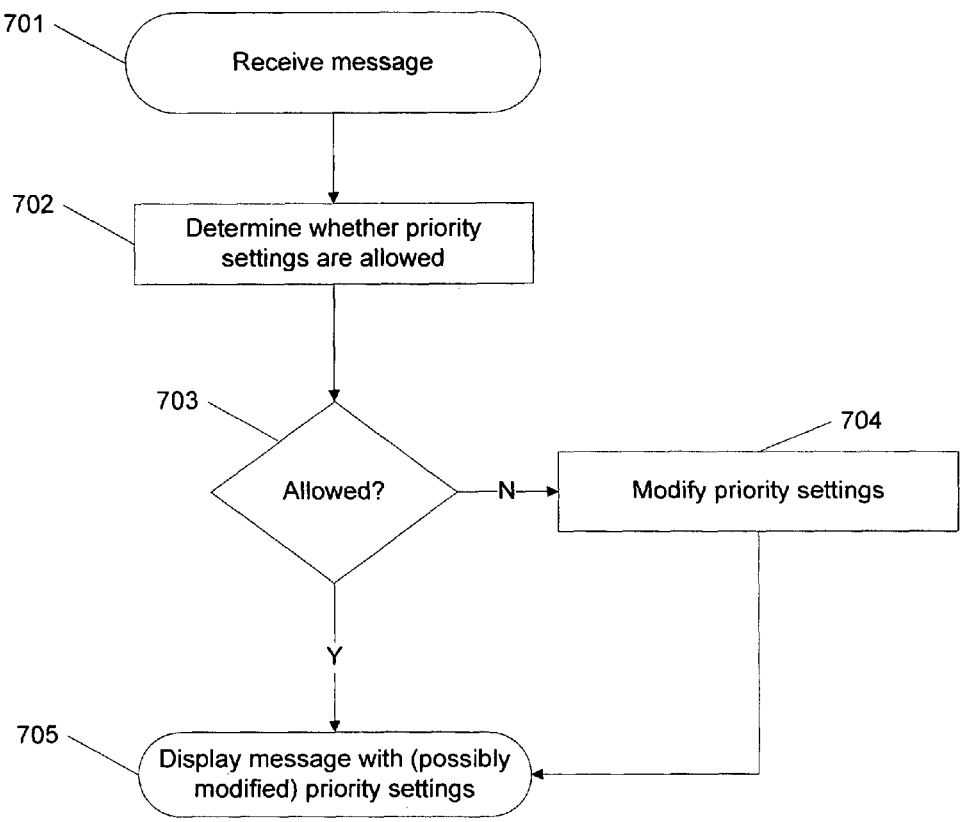
FIG. 7 is a flow diagram of a method for filtering priority settings, according to some embodiments.

FIG. 7 is a flow diagram of a method for filtering priority settings, according to some embodiments. Priority settings refer herein to one or more settings associated with a message that specify desired treatment for the message. Examples of priority settings include importance and/or sensitivity settings such as "high priority" or "confidential." In this example, a message may be received (701), for example by an email client, mail server, or proxy filter. An example of a proxy filter is a filter that processes a message before it is received by an email client or server. The message may be checked for associated priority settings and, if found, associated priority settings may be checked to determine whether they are allowed (702). An example of checking to determine whether a priority setting is allowed is to check permissions associated with a sender of the message. In some embodiments, configuration options may be provided that allow per-user or per-group configuration of allowed priority settings. For example, a default value may be to disallow priority settings, while a user or administrator may be able to allow priority settings for a particular user or group of senders, such as senders at the same company as the recipient, or senders at a company with whom the recipient or his/her company does business. In another example, whitelisted senders may be allowed to use priority settings, or may be assigned a different default state of being allowed to use priority settings, while non-whitelisted senders may not. If priority settings associated with the message are not allowed (703), then they may be modified to conform to allowed priority settings (704). One example of modifying priority settings is to remove any priority settings associated with a message that are not allowed. Another example of modifying priority settings is to keep the priority settings, but display the message differently, for example as if the priority settings were not present. The message with associated allowed priority settings may be displayed (705). An example of displaying a message with associated allowed priority settings is to display the message with a visual indication of one or more associated priority settings, such as an exclamation mark next to the message.

Figure 8:
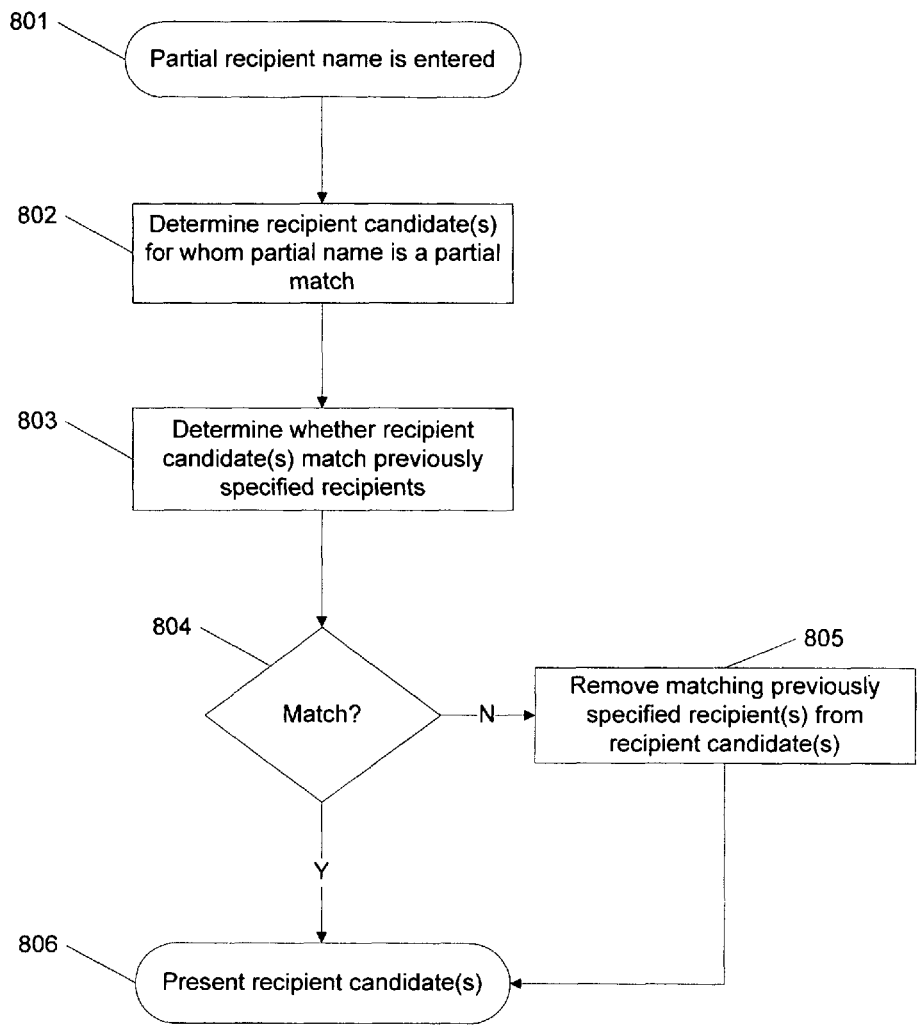
FIG. 8 is a flow diagram of a method for avoiding duplicate recipient names for an electronic message, according to some embodiments.

FIG. 8 is a flow diagram of a method for avoiding duplicate recipient names for an electronic message, according to some embodiments. In this example, a partial recipient name is entered (801). An example of entering a partial name is for a user to type in part of a name in a field designated for recipients of a message, such as a "To," "CC" or "BCC" line of an email header. In some embodiments, entering a partial name may include requesting an autocompletion such as a list of recipient candidates, for example by pausing while typing, typing a designated key such as the space bar or ENTER key, or performing a mouse action such as a right-click. An example of a recipient name is a messaging address such as an email address. Another example of a recipient name is a name associated with a messaging address, such as a name for which an entry in an address book such as Outlook exists, wherein the entry is associated with a messaging address such as an email address. One or more recipient candidates may be determined for which the partial name is a match (802). In some embodiments, a match may be an exact match, such as a complete match or a match of the leading characters of a valid recipient name. In some embodiments, a match may be a partial match, for example a substring match or an approximate match. It may be determined whether some recipient candidate(s) have already been specified as a recipient for the message (803). An example of determining whether some recipient candidate(s) have already been specified as a recipient for the message is to check previously specified recipients (for example, recipients already on a "To," "CC" or "BCC" line of an email header) to determine whether one or more recipient candidate names are already recipients of the message. Another example of determining whether some recipient candidate(s) have already been specified as a recipient for the message is to check previously specified recipients in the field being typed in (for example, recipients already on a "To" field when entering additional "To" entries, or already in a "CC" when entering additional "CC" entries, or already in a "BCC" field when entering additional "BCC" entries) to determine whether one or more recipient candidates are already recipient(s) of the message. If one or more recipient candidates match previously specified recipients of the message (804), then previously specified candidate(s) may be removed from further consideration as recipient candidates (805). One or more recipient candidates may be presented (806). An example of presenting a recipient candidate is to display the candidate in a manner that the user may select as a recipient for the message, for example by presenting a pull-down list containing selectable recipient candidate(s), or enabling autocompletion, for example by enabling a key such as the space bar or ENTER key, or a mouse action such as a right-click, to autocomplete the entry.

Figure 9:
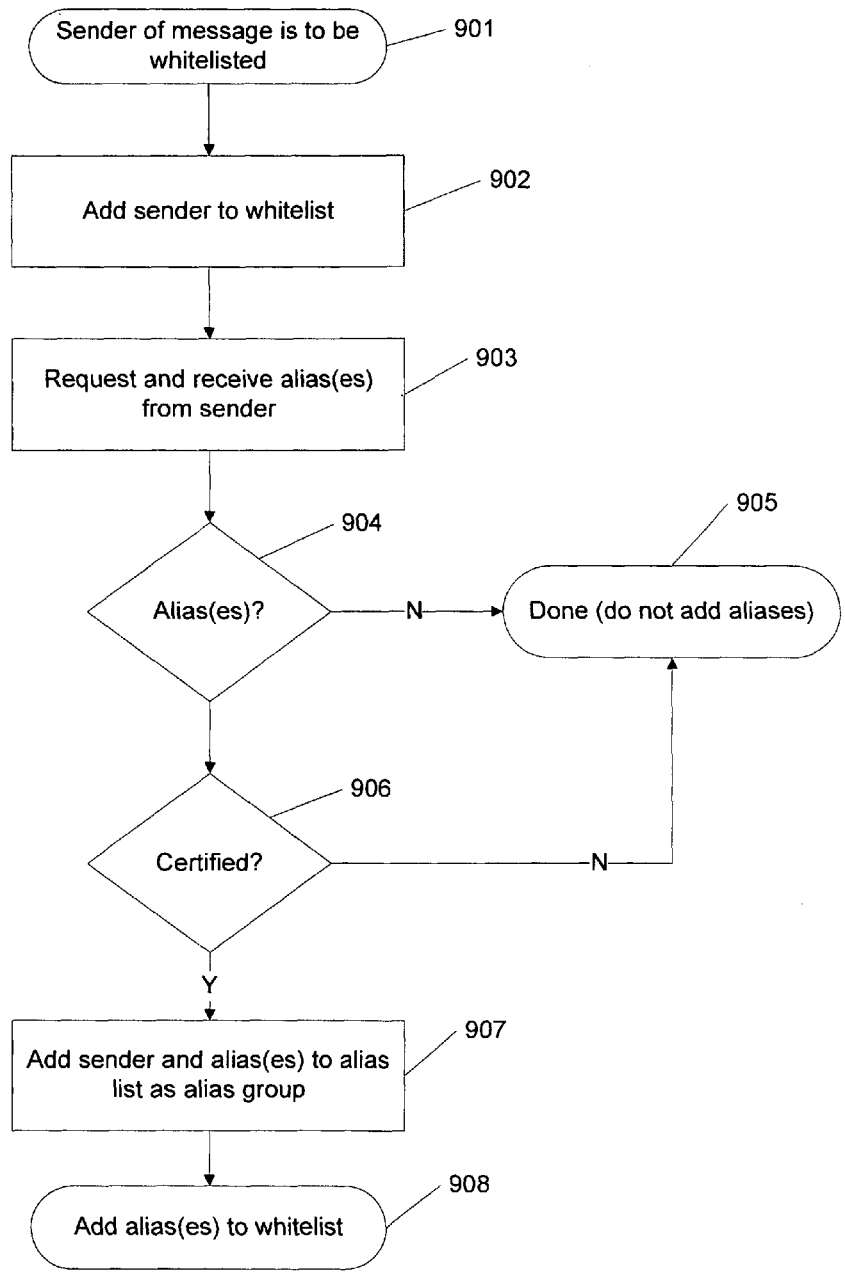
FIG. 9 is a flow diagram of a method for whitelisting aliases, according to some embodiments.

FIG. 9 is a flow diagram of a method for whitelisting aliases, according to some embodiments. An alias refers herein to an alternate messaging address for a user, such as an email address other than the email address from which a received message was sent. In some embodiments, an alias may refer to the same messaging account as another messaging address such as an address used to send a received message. In some embodiments, an alias may refer to a different messaging account as another messaging address. In some embodiments, an alias may refer to a hash of an alternate messaging address, for example a cryptographic hash such as a SHA1 or MD5 hash.

In this example, a message sender is to be whitelisted (901). An example of a reason a message sender is to be whitelisted is because a user has specified that the sender is to be trusted. Another example of a reason a message sender is to be whitelisted is that a message has been determined to be trustworthy, for example by an anti-spam content classifier, because a challenge has been successfully answered, because electronic "postage" was included or because an acceptable digital signature was included in the message. The sender may be whitelisted (902). Aliases may optionally be requested and received from the sender (903). An example of requesting aliases is to send a message to the sender requesting aliases, for example by utilizing a request coded in the header of an email. In some embodiments, a request for aliases may include an authentication token, for example a randomly generated number or string, and/or a cryptographic key to be used for encrypting a response. One example of a cryptographic key is the public half of a public/private key pair. Another example of a cryptographic key is a key used in a symmetric encryption such as DES, AES or Blowfish. In some embodiments, an appropriate address for requesting aliases may be specified within a message, for example in a header of an email message. A message specifying one or more aliases may be received. An example of specifying one or more aliases is to specify the alias(es) in a designated part of a message, such as a header of an email. In some embodiments, an alias may be encrypted, for example using a key specified in the request. In some embodiments, an alias may be a hash of a messaging address, for example a cryptographic hash such as SHA1 or MD5. In some embodiments, one or more aliases may be included in a message, for example in an email header, and a request may not be sent in this example.

If no aliases are received (904), then no aliases are added in this example (905). If one or more aliases are received (904), for example within a message or in response to a request for aliases, then they are optionally checked to determine whether they are certified (906) in this example. An example of checking to determine whether one or more aliases are certified is to determine whether a valid cryptographic signature is included. If the aliases are not certified, then no aliases are added in this example (905). If the aliases are certified, or if no certification was required, then an alias group is optionally created in this example, containing the sender address and one or more aliases addresses (907). An alias group refers herein to any mechanism by which multiple addresses may be identified with a single identity. An example of an alias group is a list of identifiers and associated messaging addresses, such as the sender address and any alias addresses. In some embodiments, an alias group may be created implicitly, for example by grouping aliases together in a whitelist. One or more aliases may be whitelisted (908), for example by adding each alias to a whitelist, or by adding an alias group to a whitelist.

Figure 10:
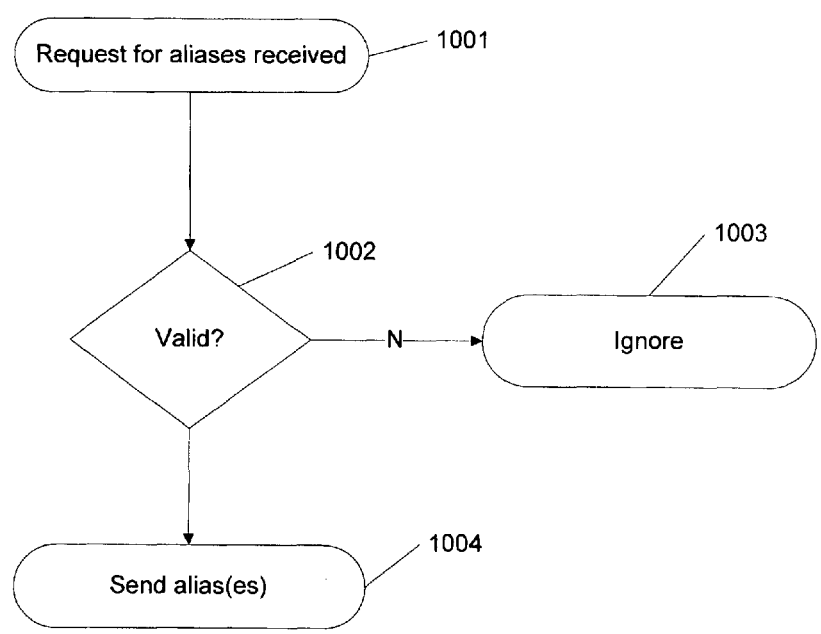
FIG. 10 is a flow diagram of a method for responding to a request for aliases, according to some embodiments.

FIG. 10 is a flow diagram of a method for responding to a request for aliases, according to some embodiments. In this example, a request for aliases may be received (1001). A request for aliases may, for example, have been sent as described in conjunction with 903 of FIG. 9. An example of a request for aliases is an email message with a request embedded in the header. In some embodiments, a request for aliases may include a cryptographic key. One example of a cryptographic key is the public half of a public/private key pair. Another example of a cryptographic key is a key used in a symmetric encryption such as DES, AES or Blowfish. In some embodiments, a request for aliases may include an authentication token. The request may be examined to determine whether it is valid (1002). An example of examining the message is to determine whether the message is a reply to a message that was sent. An example of determining whether the message is a reply to a message that was sent is to check a message identifier associated with the message, for example an identifier in an "in-reply-to" field of an email message, to determine whether the identifier is associated with a valid message. Another example of determining whether a request is legitimate is to determine whether the request contains a valid authentication token, for example a token previously included in an outgoing message. If the request is determined not to be valid (1002), then the request is ignored in this example (1003). If the request is determined to be valid (1002), then a response containing one or more aliases may be sent (1004). An example of sending a response is to send a message containing one or more aliases, for example in an email header. In some embodiments, an authentication key may be included in the response, for example an authentication key that was provided in the request. In some embodiments, aliases may be encrypted, for example using a key that was provided in the request. In some embodiments, aliases may be individually hashed, for example using a cryptographic hash such as SHA1 or MD5.

FIG. 11 is an example of an alias request message, such as described in conjunction with 903 of FIG. 9, according to some embodiments. In this example, an alias request is an email message containing a request for aliases of sender@sender.com 1101, associated with a predetermined email header field, which in this example is named "X-Alias-Request." A request message may contain proof of validity 1102. In this example, proof of validity is a message identifier associated with a valid message previously sent by sender@sender.com. A marketing message 1103 may be included, informing a recipient who lacks software, such as software as discussed in conjunction with FIG. 10, that is capable of automatically responding to a request for aliases. A marketing message may include a natural language description of alias capabilities, and an indication of a way to obtain software, such as a URL or messaging address.

FIG. 12 is an example of a response to an alias request message, such as described in conjunction with 903 of FIG. 9, according to some embodiments. In this example, a response is an email message containing aliases 1203, associated with a predetermined email header field, which in this example is named "X-Aliases." A response message may also contain proof of validity 1202. In this example, proof of validity is a message identifier associated with an alias request previously sent by recipient@recipient.com. In some embodiments, a response message may be associated with a low priority, such as a bulk priority 1201. In some embodiments, an alias response may include a backup message 1204, which in this example includes a statement that the email may be deleted, in case it mistakenly reaches a user. Another example of a backup message is a message explaining that this email was a response to an alias request that the current email viewing software should have already processed.

FIG. 13 is an example of an email message containing information associated with aliases and change of address, according to some embodiments. The message of FIG. 13 would, for example, be applicable to processes described in conjunction with FIGS. 9 and 15. In this example, a message (in this example, an email) contains aliases 1301 (ssender@work.com and anonymous@hotmail.com) in a header line labeled with "X-Aliases." These aliases may, for example, be processed as described in conjunction with 907 of FIG. 9. This exemplary email also contains an encoded cryptographic certificate 1302 certifying that the aliases are legitimate, which may for example be signed by a trusted certification authority. This certificate 1302 may, for example, be evaluated as described in conjunction with 906 of FIG. 9. A change-of-address authentication token 1303 is provided which may be used in a subsequent change-of-address message, for example as described in conjunction with 1603 of FIGS. 16 and 1903 of FIG. 19. A fingerprint 1304 of a public key is provided, corresponding to a private key that can be used to encrypt a subsequent change-of-address message, for example as described in conjunction with 1602 and 1603 of FIGS. 16 and 2101 and 2102 of FIG. 21. Additionally, the message in this example includes a change-of-address authority 1305 that may be trusted to provide subsequent changes of address, as discussed in conjunction with 1603 of FIG. 16 and FIG. 20.

In some embodiments, elements contained in a message such as the message of FIG. 13 may be inserted, for example automatically inserted, into outgoing email messages, for example all outgoing email messages, or outgoing email messages with recipients who have not previously received email messages from the sender. As a second example of automatic insertion in outgoing messages, the insertion may be periodic on a per correspondent basis, for example inserting such information whenever it has been more than a fixed length of time, such as a month, since the last inclusion for a given correspondent. In such embodiments, a message body 1306 may contain text, HTML, attachments, and/or other contents.

Figure 14:
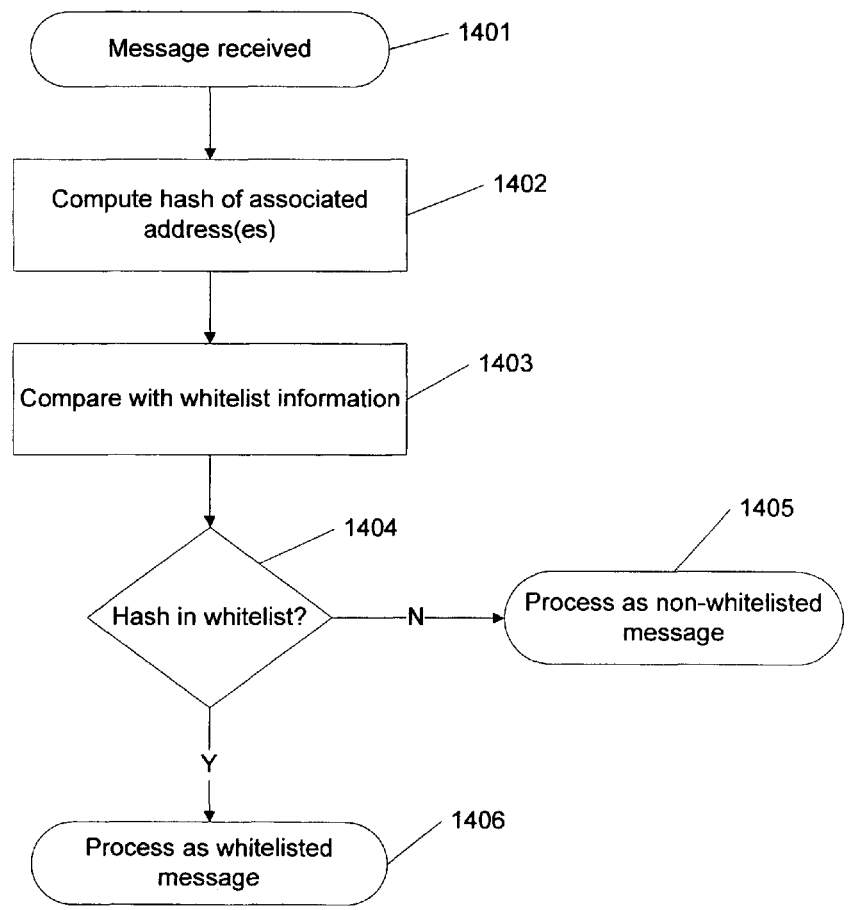
FIG. 14 is a flow diagram of a method for hash-based whitelisting, according to some embodiments.

FIG. 14 is a flow diagram of a method for hash-based whitelisting, according to some embodiments. In this example, a message may be received (1401), for example an email message. Examples of receiving a message include receiving by a server such as a mail transfer agent, receiving by a messaging client such as an email client or an instant messaging client, and receiving by a proxy such as an intermediate layer between a messaging server and a messaging client. One or more addresses associated with the message may be determined and hashed (1402). An example of determining an address associated with the message is to retrieve the address from information associated with the message, such as a header of an email. An example of an address associated with the message is an address of a sender of the message. Another example of an address associated with a message is an address of a recipient of the message, for example a recipient address other than an address of the recipient for whom the message is being processed. An example of a hash is a cryptographic hash, such as an MD5 hash or a SHA1 hash. The hashed address(es) may be compared to whitelist information (1403), for example by determining whether the whitelist information is associated with a hashed address.

If a hashed address is not associated with the whitelist information (1404), then the message is treated as a non-whitelisted message in this example (1405). An example of treating a message as a non-whitelisted message is to evaluate whether it might be an unwanted message such as a spam message. If a hashed address is contained in the whitelist information (1404), then the message is treated as a whitelisted message in this example (1406). An example of treating a message as a whitelisted message is to treat the message preferentially, for example by delivering the message without some or all processing to determine whether the message is an unwanted message such as a spam message, or by using a less stringent evaluation to determine whether the message is an unwanted message such as a spam message.

Figure 15:
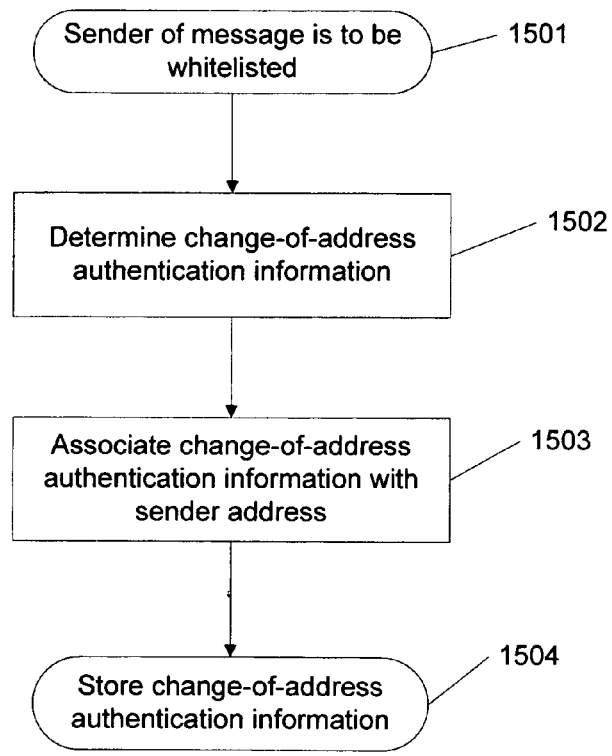
FIG. 15 is a flow diagram of a method for receiving change-of-address authentication information, according to some embodiments.

FIG. 15 is a flow diagram of a method for receiving change-of-address authentication information, according to some embodiments. In this example, a sender of a message is to be whitelisted (1501). An example of a reason a message sender is to be whitelisted is because a user has specified that the sender is to be trusted. Another example of a reason a message sender is to be whitelisted is that a message has been determined to be trustworthy, for example by an anti-spam content classifier, because a challenge has been successfully answered, because electronic "postage" was included or because an acceptable digital signature was included in the message.

Change-of-address authentication information may be determined (1502). Change-of-address authentication information refers herein to any information that may be used to authenticate a change-of-address request. One example of change-of-address authentication information is an authentication token, for example a randomly or incrementally generated number. Another example of change-of-address authentication information is a cryptographic key, for example the public half of a public/private key pair. Another example of change-of-address authentication information is a fingerprint of a cryptographic key, for example a fingerprint of a symmetric encryption key or a fingerprint of the public half of a public/private key pair. A fingerprint of a key refers herein to any condensed form of a key, for example a cryptographic hash of a key such as an MD5 or SHA1 hash. Another example of change-of-address authentication information is a designation of one or more change-of-address authorities from whom subsequent change-of-address messages may be authorized. A change-of-address authority refers herein to any entity to whom authorization may be granted to issue change-of-address directives, for example an internet-based service that automatically transmits such directives to correspondents when a messaging address changes and/or responds to queries and provides the newest applicable address(es).

Determining change-of-address information may include retrieving change-of-address information and/or assigning change-of-address information. An example of retrieving change-of-address authentication information is to retrieve the information from the message. An example of retrieving the information from the message is to retrieve the information from the header of an email message, for example by retrieving change-of-address authentication information associated with an email header such as "X-COA-Token," as illustrated in 1303 of FIG. 13, wherein a change-of-address token of "ke82hd9sjk3un8x+2kd8co2fum8+duem" is shown. Another example of change-of-address authentication information in an email header is illustrated in 1304 of FIG. 13, wherein a fingerprint of a cryptographic key for use in a subsequent change of address is "0E2AB235019B5C582D52059A3D9B84DB," associated with the email header "X-Address-Change-Fingerprint." Another example of change-of-address authentication information in an email header is illustrated in 1305 of FIG. 13, wherein the change-of-address authority "addresschangenotify.com" is shown associated with the email header "X-Address-Change-Authority."

In some embodiments, change-of-address authentication information may be received from an alternate communications channel, for example a server designated in the message, through a network connection such as a TCP/IP connection. In some embodiments, change-of-address authentication information may be assigned by a message recipient, for example by retrieving or generating change-of-address authentication information and transmitting it to the sender, for example via a message of the same type (such as email or SMS) as the message received, or via a message of a different type.

Change-of-address authentication information may be associated with the address of the sender of the message (1503). The change-of-address authentication information may be stored (1504), for example by associating the information with an entry in an electronic address book and/or a whitelist, wherein the entry is associated with the sender of the message. In embodiments in which change-of-address authentication information is generated and transmitted (1502), storage may be implicit, for example because the same change-of-address authentication information may be acceptable for more than one correspondent, for example every correspondent using the same type of message.

Figure 16:
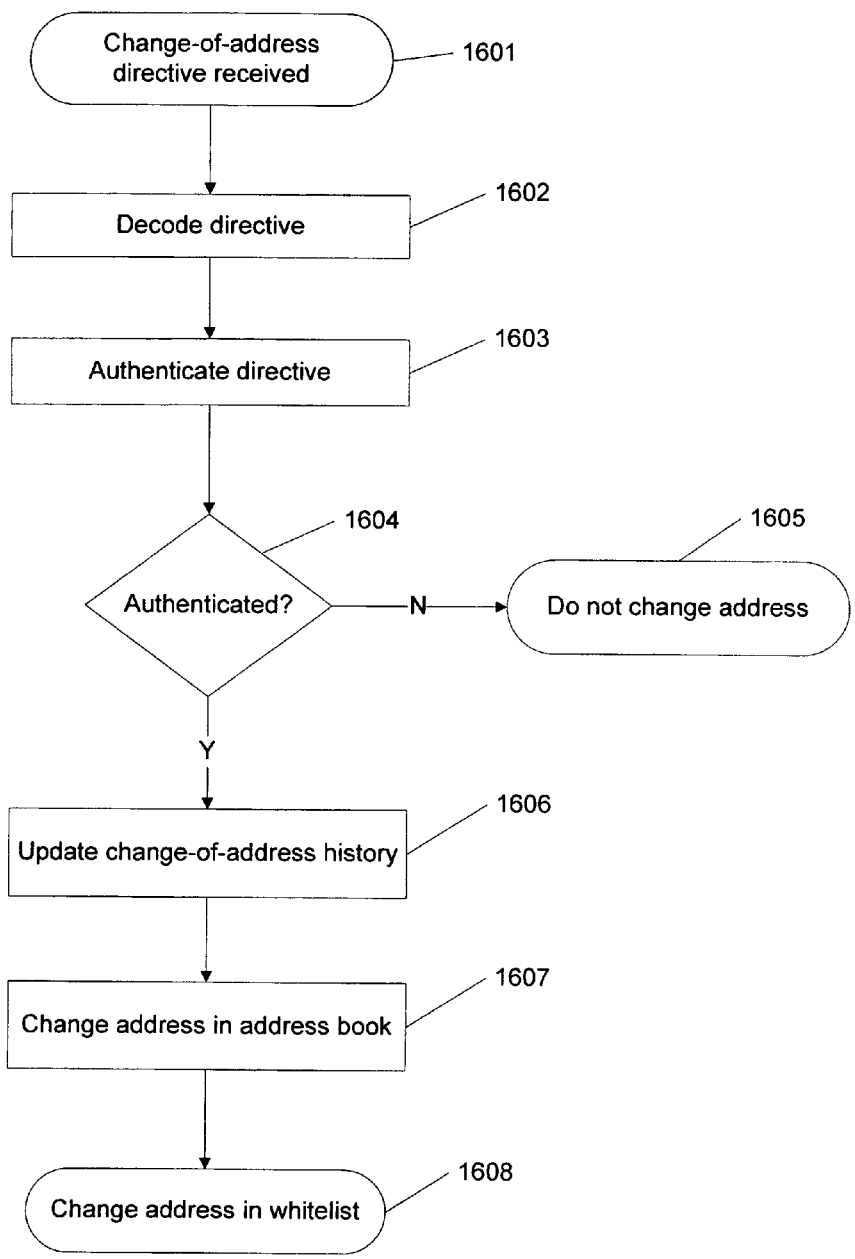
FIG. 16 is a flow diagram of a method for processing a change-of-address directive, according to some embodiments.

FIG. 16 is a flow diagram of a method for processing a change-of-address directive, according to some embodiments. A change-of-address directive refers herein to any directive instructing an update to contact information, such as a messaging address, wherein the directive is associated with an old address and a new address. In some embodiments, the old address and/or new address may be implicit. An example of an implicit address is an address used to send a message. In this example, a change-of-address directive is received (1601). An example of receiving a change-of-address directive is to receive a message with an embedded change-of-address directive. Examples of such messages are illustrated in FIGS. 19, 20 and 21. Another example of receiving a change-of-address directive is to receive a change-of-address notice from a change-of-address authority. In some embodiments, the change-of-address directive may be decoded to determine constituent information, for example an old address and/or a new address (1602). An example of decoding a directive is to decrypt some or all of the directive using a cryptographic key associated with the directive or with a sender of the directive. An example of a message in which a directive may be decoded is illustrated in FIG. 21, wherein a directive 2102 may be decoded using a provided key 2101. Another example of a message in which a directive may be decoded is illustrated in FIG. 20, wherein a key associated with a change-of-address authority 2001 may be used to decode a directive 2102. Another example of a message in which a directive may be decoded is a message containing an old address and an encrypted new address, wherein the new address may be decrypted using a key associated with the old address. Another example of a message in which a directive may be decoded is message containing an old address, a cryptographic key and an encrypted new address, wherein the cryptographic key may be used to decrypt the new address. In some embodiments, a token such as a predetermined token or the old address may be included in encrypted data, and may for example be used to determine whether a decoding operation was successful by determining whether it is present in decoded data.

The change-of-address directive may optionally be authenticated (1603). An example of authenticating a change-of-address directive is to compare authentication information associated with the directive to stored authentication information, for example stored authentication information associated with the old address. One example of comparing authentication information is to determine whether an authentication token provided with a change-of-address directive matches a stored token. For example, FIG. 19 illustrates an authentication token 1903 associated with an old address 1901. If the authentication token 1903 matches a stored token associated with the old address 1901, then the directive is authenticated in this example. Another example of comparing authentication information is to determine whether a change-of-address authority providing the directive is authorized to do so. For example, FIG. 20 illustrates a change-of-address authority 2001. If the old address contained in the decoded directive 2002 is associated with the change-of-address authority 2001, then the directive is authenticated in this example. In some embodiments, a change-of-address authority may be verified, for example by confirming that a message was sent by the authority specified. Examples of confirming an email message sender include cryptographic signatures and domain-based verification such as SPF, Sender-ID and Domain Keys. Another example of comparing authentication information is to determine whether the directive is cryptographically signed with a private key corresponding to a stored public key. Another example of comparing authentication information is to determine whether a decryption key provided with the change-of-address directive, which may be used to decrypt part or all of the directive, matches a stored fingerprint. For example, FIG. 21 illustrates a cryptographic key 2101 and a change-of-address directive 2102. If the key 2101 matches a key or fingerprint associated with an old address contained in the directive 2102, then the directive is authenticated in this example. An example of determining whether a key matches a fingerprint is to determine whether a hash of the key, for example a cryptographic hash such as SHA1 or MD5, matches the fingerprint.

If the change-of-address directive is not authenticated (1604), then an address is not changed in this example (1605). If the change-of-address directive is authenticated (1604), then a change-of-address history is optionally updated in this example (1606), for example by recording the old address, new address, and optionally the time and/or date. A change-of-address history refers herein to any way that information associated with historical changes of addresses may be stored, for example a log associated with an entry in an electronic address book or whitelist, or separately accessible stored data. An address entry may optionally be updated in an address database such as an electronic address book (1607), for example by replacing one or more occurrences of the old address with the new address. A whitelist entry may optionally be updated (1608), for example by replacing the old address with the new address. In some embodiments, updating change-of-address information (1607, 1608) may be performed automatically. In some embodiments, a user may be prompted before change-of-address information is updated. In some embodiments, prompting may be configurable by a user or administrator, for example by modifying configuration values in a configuration file such as a registry.

Figure 17:
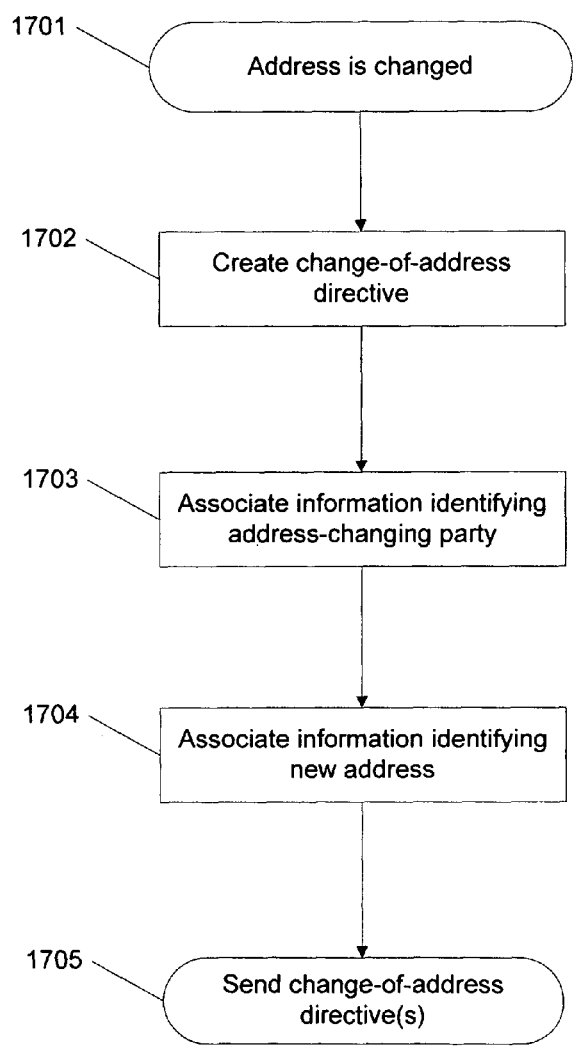
FIG. 17 is a flow diagram of a method for sending a change-of-address directive, according to some embodiments.

FIG. 17 is a flow diagram of a method for sending a change-of-address directive, according to some embodiments. In this example, an address is changed (1701). An example of a messaging address being changed is that a user of a change-of-address authority has changed a messaging address manually, for example through a web-based interface provided by the change-of-address authority or an affiliate. Another example of a messaging address being changed is that a user has changed a messaging address or signed up for a new email address through an entity such as an ISP, which sends change-of-address information. Another example of a messaging address being changed is that client messaging software is reconfigured to use a different messaging address. One example of a situation in which client messaging software has been reconfigured to use a different messaging address is that a user has explicitly changed a messaging address. Another example of a situation in which client messaging software has been reconfigured to use a different messaging address is when an account is added. In some embodiments, when a new account is added to a list of accounts, messaging software may infer that a change of address has taken place. Such an inference may be automatic or manual. For example, an automatic inference may take place when there are few other accounts, such as one other account, handled by the current configuration, and another account is disabled or deleted contemporaneously, for example during a single use of the configuration editing software. In some embodiments, inference may be manual, and/or substantiated by a dialog box. For example, a manual confirmation by a user that a new account is the changed address of an existing (or recently deleted or disabled) account may provide such substantiation.

A change-of-address directive may be created (1702), for example an empty change-of-address directive. Information indicating the identity of the party changing addresses may be associated (1703). One example of information indicating the identity of the party changing addresses is a messaging address such as the messaging address being changed. Another example of information indicating the identity of the party changing addresses is authentication information such as an authentication token. Another example of information indicating the identity of the party changing addresses is a user identifier, such as an identifier used for a change-of-address authority. Information indicating the new messaging address may be attached (1704). The change-of-address directive may be sent to one or more recipients (1705). Examples of change-of-address directives for email addresses are illustrated in FIGS. 19 through 21. One example of sending the change-of-address directive is to send it to a change-of-address authority. In some embodiments, a change-of-address authority may perform a process such as the process described in conjunction with FIG. 18. Another example of sending the change-of-address directive is to send it to one or more correspondents, for example as described in conjunction with 1802 and 1803 of FIG. 18.

Figure 18:
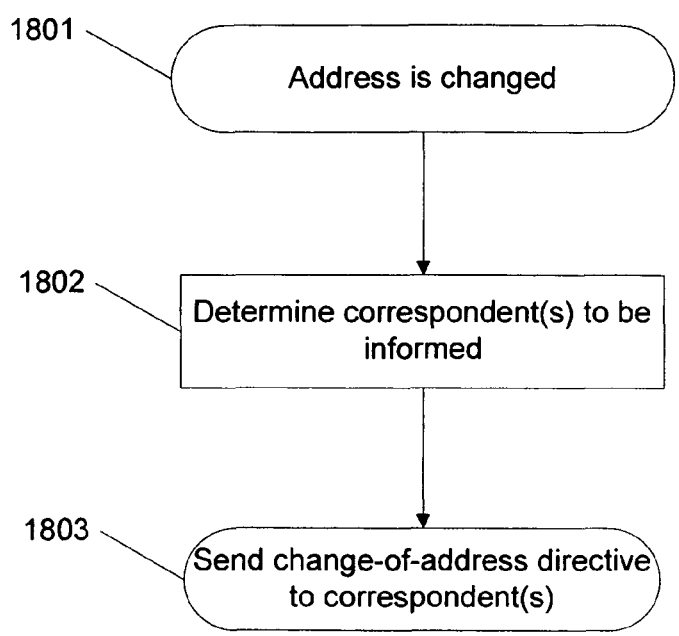
FIG. 18 is a flow diagram of a method for disseminating a change of address, according to some embodiments.

FIG. 18 is a flow diagram of a method for disseminating a change of address, according to some embodiments. The method of FIG. 18 may, for example be performed by software associated with a party changing an address, including software associated with a messaging client or a messaging server, or a change-of-address authority. In this example, a messaging address is changed (1801). An example of a messaging address being changed is that a user of a change-of-address authority has changed a messaging address manually, for example through a web-based interface provided by the change-of-address authority or an affiliate. Another example of a messaging address being changed is that a user has changed a messaging address or signed up for a new email address through an entity such as an ISP, which sends change-of-address information. Another example of a messaging address being changed is that client messaging software is reconfigured to use a different messaging address. In some embodiments, a change-of-address directive may have been sent as described in conjunction with FIG. 17.

One or more correspondents to be informed of a change of address may be determined (1802). One example of determining correspondents is to retrieve a list of correspondents. One example of retrieving a list of correspondents is to retrieve it from an online data source, such as an address book maintained by a change-of-address authority or an affiliate. Another example of retrieving a list of correspondents is to retrieve the correspondents via a data source associated with sending and/or receiving messages, such as a message log kept by an ISP or outgoing and/or incoming mail spools. Another example of retrieving a list of correspondents is to retrieve correspondents from an address book such as a locally stored address book. Another example of determining correspondents is to select correspondents who have subscribed to change-of-address notifications, for example who have subscribed to change-of-address notifications for the particular entity whose address has changed. In some embodiments, such subscriptions may be subject to review and approval by the entity whose address changes are requested. Such review and approval may, for example, be accomplished through social networking mechanisms known to those skilled in the art, for example as used by services such as Orkut or Friendster. Another example of determining correspondents is to receive one or more requests for a change-of-address notification, which may for example be sent periodically or when an attempt to send a message fails.

A change-of-address directive may be sent to one or more correspondents (1803). Examples of change-of-address directives for email messaging addresses are illustrated in FIGS. 19 through 21.

FIG. 19 is an example of a token-authenticated change-of-address directive, according to some embodiments. In this example, an email includes an address change directive 1902 in a header, which in this example is labeled "X-Address-Change." An authentication token 1903 provides authentication that a recipient of the directive may verify, and an old address 1901 and a new address 1904 are provided. In some embodiments, an authentication token may be uniquely created for each recipient, or for each message. In some embodiments, authentication tokens are used only in messages with a single recipient. In some embodiments, when an email is forwarded, authentication tokens are automatically removed from the forwarded message, For example, an email composition program may remove potentially forwarded authentication tokens, including removing during composition, or removal just prior to sending the message. A message body 1905 provides a human-readable request for a recipient to update his or her contact information, and a viral marketing message 1906 provides information on how the recipient may obtain software to automatically process change-of-address directives, in this example with a clickable link to www.changeofaddresssoftware.com.

FIG. 20 is an example of an authority-authenticated change-of-address directive, according to some embodiments. In this example, an email includes an indication of a change-of-address authority 2001, which in this example may be the sender of the message, or a domain associated with the sender of the message, e.g. coaaaddresschangenotify.com or addresschangenotify.com. The message includes a change-of-address directive 2002, which in this example is encrypted using a public key associated with the change-of-address authority. A message body 2003 provides a human-readable request for a recipient to update his or her contact information, and a viral marketing message 2004 provides information on how the recipient may obtain software to automatically process change-of-address directives, in this example with a clickable link to www.changeofaddresssoftware.com.

FIG. 21 is an example of a fingerprint-authenticated change-of-address directive, according to some embodiments. In this example, an email includes a change-of-address directive 2102, which is encrypted using a key 2101. The key 2101 may, for example, be authenticated against a stored fingerprint as described in conjunction with 1603 of FIG. 16. A message body 2103 provides a human-readable request for a recipient to update his or her contact information, and a viral marketing message 2104 provides information on how the recipient may obtain software to automatically process change-of-address directives, in this example with a clickable link to www.changeofaddresssoftware.com.

Figure 22:
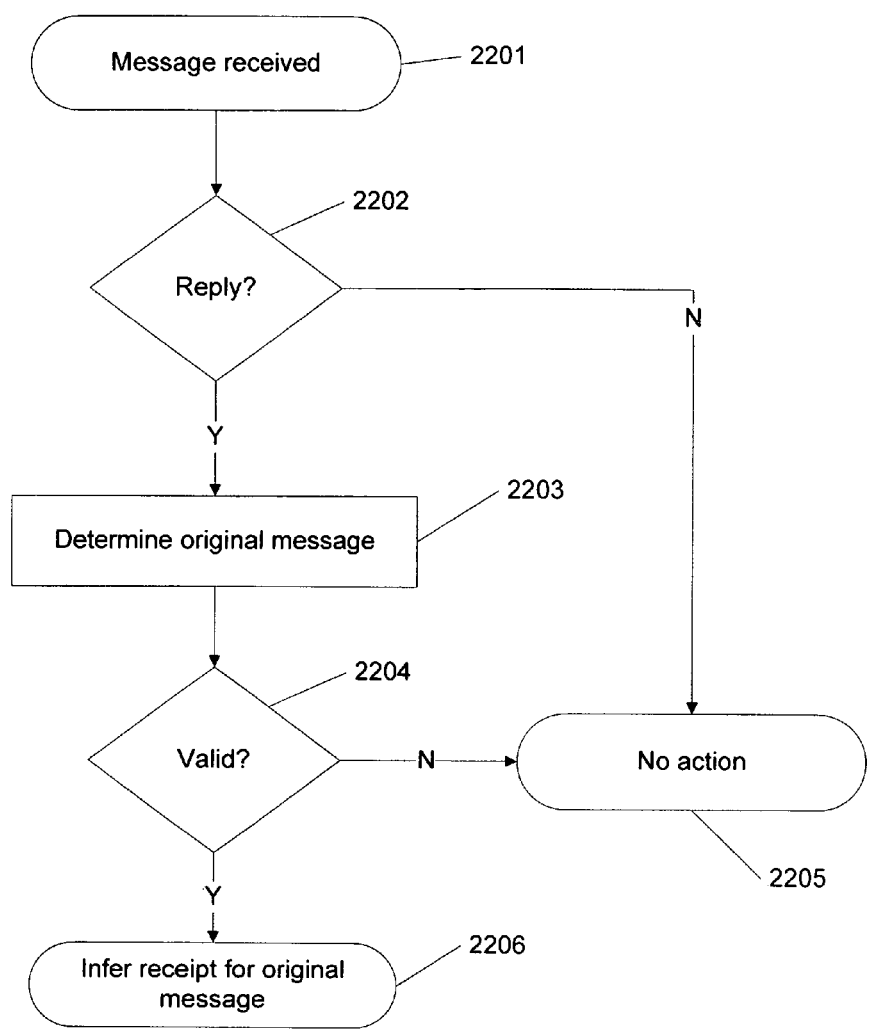
FIG. 22 is a flow diagram of a method for inferring a return receipt, according to some embodiments.

FIG. 22 is a flow diagram of a method for inferring a return receipt, according to some embodiments. A return receipt refers herein to an indication that a message has been received and/or read. An example of a return receipt is an email message in which a header line specifies a "Content-Type" of "multipart/report" and a "report-type" of "disposition-notify." In this example, a message is received (2201), for example by an email server, client, or proxy layer. It is determined whether the message is a reply (2202). An example of determining whether a message is a reply is determining whether an email has an "In-Reply-To" header. In some embodiments, challenges sent by a challenge/response module may be considered replies, or may be considered replies when responded to. If the message is not a reply, then no additional action is taken in this example (2205). For example, the message may be processed as usual. If the message is a reply (2202), then an original message is determined for which the message is a reply (2203). An example of determining the original message is to retrieve a message ID associated with the "In-Reply-To" header in an email message. It is determined whether the original message is valid (2204). An example of a valid original message is a message that was previously sent. Another example of a valid original message is an original message that is still available in some form such as an outgoing message queue. If the original message is not valid (2204), for example because if does not exist or is no longer available, then no further action is taken in this example (2205). If the original message is valid, then a return receipt may be inferred for the original message (2206). An example of inferring a return receipt is to mark the original message as having been received, for example as discussed in conjunction with FIG. 28. Another example of inferring a return receipt is to generate and optionally deliver a return receipt message associated with the original message, indicating that the original message was received and/or read. In some embodiments, inferring a return receipt (2206) may be performed only for an original message for which no return receipt has otherwise been received.

Figure 23:
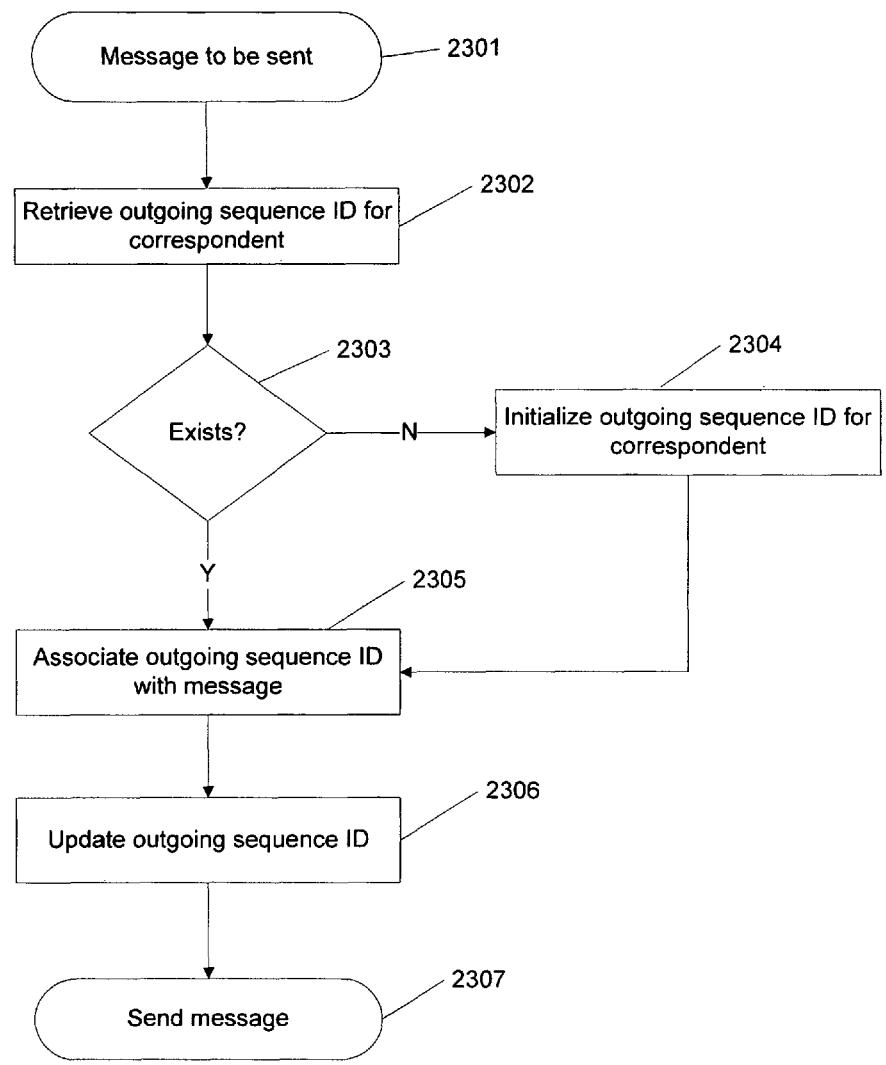
FIG. 23 is a flow diagram of a method for associating a sequence identifier with an outgoing message, according to some embodiments.

FIG. 23 is a flow diagram of a method for associating a sequence identifier with an outgoing message, according to some embodiments. In this example, a message is to be sent (2301), for example because a user has elected to send a message, or software has generated a message and submitted it to be sent. In some embodiments, sequence identifiers may be used only for messages with one recipient. In some embodiments, sequence identifiers may be used for messages with more than one recipient. In some embodiments, recipients not visible in the message, such as bcc recipients, may not be given sequence identifiers, or are not considered part of a correspondent list when creating one or more sequence identifiers for the message. In some embodiments, recipients not visible in the message may be separated from other recipients and sent a separate message including a sequence identifier. An outgoing sequence identifier associated with a correspondent such as a recipient of the message may be retrieved (2302). In some embodiments, the retrieved sequence number may be associated with a set of correspondents, for example the recipients of the message, rather than an individual correspondent. An example of an outgoing sequence identifier is an integer number. If an outgoing sequence identifier associated with the correspondent is not found (2303), then a sequence identifier may be created and initialized (2304). One example of creating and initializing a sequence identifier is to use a predetermined value, for example zero. Another example of creating and initializing a sequence identifier is to determine an initial condition that determines a sequence of sequence identifiers, for example a pseudorandom sequence. An example of an initial condition for a pseudorandom sequence is to determine values for a, x[0], c and m for a linear congruential sequence wherein the $i^{th}$ item in the sequence x[i] is calculated as $x[i]=(ax[i-1]+c)$ mod m. Details of selection of appropriate values for a, x[0], c and m are known to those skilled in the art, and may for example be found in Don Knuth, *The Art of Computer Programming, Vol. 2: Seminumerical Algorithms* (Second Edition, ISBN 0-201-03822-8), pp. 9-24, which is incorporated herein by reference for all purposes. In embodiments in which a non-trivial sequence is defined, an initial condition may be encoded in the message, or in a separate message sent solely to the recipient, or may be transmitted using techniques known to those skilled in the art, such as Diffie-Helman exponential key exchange. Details of key exchange algorithms may be found, for example, in Chapter 22 of Bruce Schneier, *Applied Cryptography* (Second Edition, ISBN 0-471-12845-7), which is incorporated herein by reference for all purposes.

The sequence identifier may be associated with the message (2305), for example by inserting it into the message, for example into a header of an email message. Examples of inserting a sequence identifier into the header of an email message include creating a header line such as "X-Sequence-Tracking: XXX" wherein XXX is a sequence number. Another example of inserting a sequence identifier into the header of an email message include creating a header line such as "X-Sequence-Tracking: YYY, XXX" wherein XXX is a sequence number and YYY is a recipient address. In some embodiments, multiple sequence numbers may be inserted for multiple recipients of a message. In some embodiments, a message may be sent in multiple sub-messages for multiple recipients, each sub-message containing one or more sequence identifiers associated with recipient(s). In some embodiments, initial conditions for a sequence of sequence identifiers may be associated with the message.

The outgoing sequence identifier associated with a correspondent may be updated (2306), for example by updating the sequence identifier and associating it with the correspondent, or by updating an outgoing sequence identifier already associated with the correspondent. One example of updating a sequence identifier is to increment it. Another example of updating a sequence identifier is to calculate the next identifier in a predetermined sequence such as a pseudorandom sequence. The message may be sent (2307).

Figure 24:
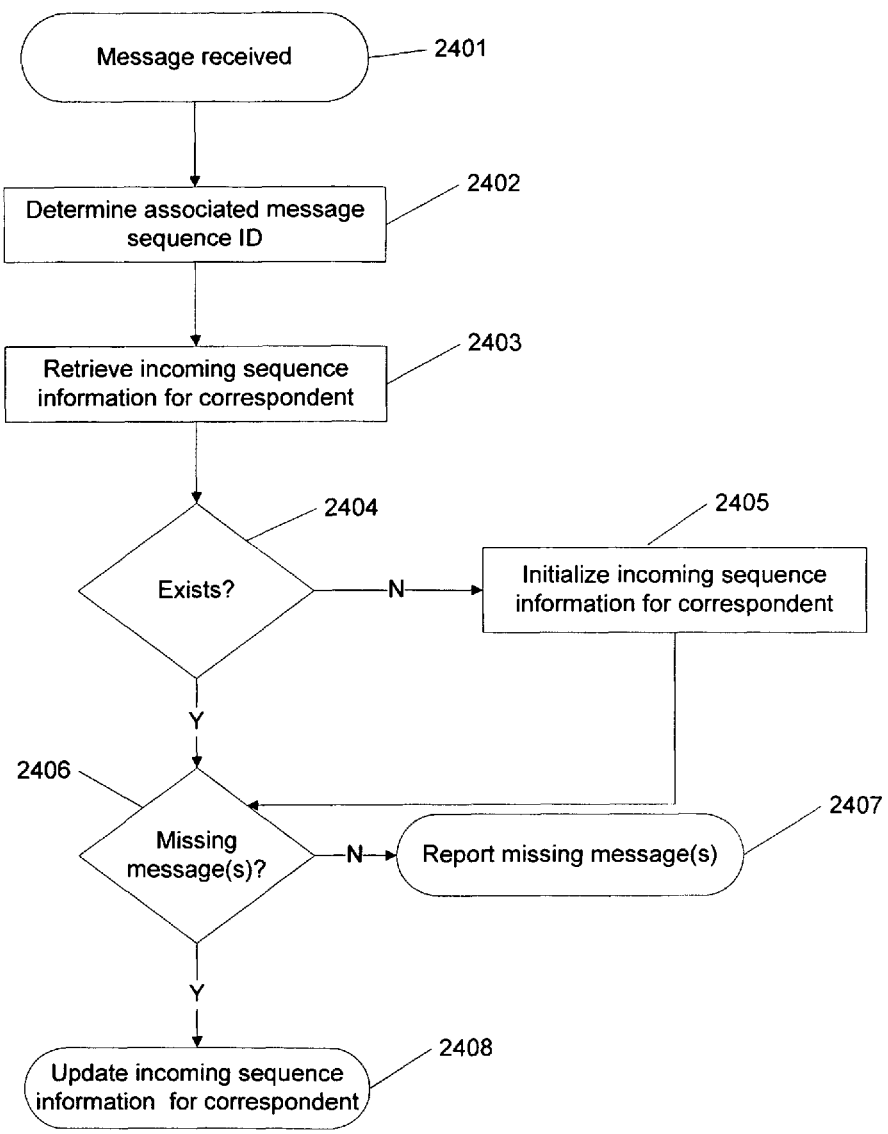
FIG. 24 is a method for inferring a lost message, according to some embodiments.

FIG. 24 is a method for inferring a lost message, according to some embodiments. In this example, a message is received (2401), for example by an email client, server or proxy layer. An associated message sequence identifier, for example a sequence identifier generated as discussed in conjunction with FIG. 23, may be determined (2402). An example of determining an associated message sequence identifier is to retrieve it from the message. One example of retrieving a message sequence identifier, in which the associated message is an email, is to retrieve it from a header line such as "X-Sequence-Tracking: XXX," wherein XXX is the message sequence identifier. Another example of retrieving a message sequence identifier, in which the associated message is an email, is to retrieve it from a header line such as "X-Sequence-Tracking: YYY, XXX," wherein YYY is a messaging address determined to be legitimate for the intended message recipient and XXX is the message sequence identifier.

Incoming sequence information for a correspondent associated with the message, such as information associated with the sender and/or recipient list of the message, may be retrieved (2403). An example of incoming sequence information is an identifier indicating the last incoming sequence identifier associated with the correspondent(s), herein referred to as the incoming sequence identifier. Another example of incoming sequence information is a list containing one or more received message sequence identifiers, associated with a previous message sequence identifier. If it is determined that there is no incoming sequence information associated with the correspondent (2404), incoming sequence information may be initialized and associated with the correspondent (2405). An example of initializing incoming sequence information is to use the message sequence identifier. One example of using the message sequence identifier is to store the message sequence identifier as the last received incoming sequence identifier associated with the correspondent. Another example of using the message sequence identifier is to create a new list of incoming sequence identifiers associated with the correspondent containing the message sequence identifier, with a previous message sequence identifier one previous to the expected first message sequence identifier, for example −1 in an example in which the expected first message identifier is 0 and successive integers are used for message identifiers.

It may be determined whether one or more messages are missing (2406). An example of determining whether a message is missing is to determine an expected message sequence identifier based on the incoming sequence identifier and compare the message sequence identifier with the expected message sequence identifier. An example of an expected message sequence identifier is the incoming sequence identifier plus one. Another example of an expected message sequence identifier is the sequence identifier after the incoming sequence identifier in a predetermined sequence such as a pseudorandom sequence. If the message sequence identifier is different than the expected message sequence identifier, then it is determined that one or more messages are missing in this example. For example, if the incoming sequence identifier is associated with the $i^{th}$ element in the sequence, and the message sequence identifier is associated with the $j^{th}$ identifier in the sequence, then messages between i+1 and j−1 inclusive may be determined to be missing. Another example of determining whether a message is missing is to check the message sequence identifier against a previous message sequence identifier and received sequence identifier(s) associated with the correspondent. For example, the message sequence identifier may be added to the received message identifier list (2408) and a predetermined period of time such as an hour may be allowed to pass, during which time the received message sequence identifier list may be subject to compaction as described in conjunction with 2408. If, after the time has passed, the message sequence identifier is still in the list of received message identifiers, then in this example it is reported that messages associated with the sequence identifiers expected between the associated previous sequence identifier and the message sequence identifier, other than any sequence identifiers contained in the list, are missing.

If no messages are determined to be missing (2406), the incoming sequence information associated with the correspondent is updated in this example (2408). One example of updating incoming sequence information is to set the incoming sequence identifier to the message sequence identifier. Another example of updating the incoming sequence information is to add the message sequence identifier into a list of received sequence identifiers associated with the correspondent. In this example, an associated previous message sequence identifier may be checked, and the list may be compacted. An example of compacting the list is to determine that messages with sequence identifiers corresponding to positions p+1 through n are in the received sequence identifier list, wherein p refers to the previous message sequence identifier. In this example, the previous message sequence identifier may be set to the sequence identifier associated with position n and the received message sequence identifiers p . . . n may be removed from the received message identifier list.

If messages are determined to be missing (2406), then one or more missing messages are reported in this example (2407). One example of reporting a missing message is to inform a user that one or more messages are missing. Another example of reporting a missing message is to send a message to the correspondent. An example of a message that may be sent to the correspondent is a message containing one or more expected sequence identifiers for missing message(s). An example of a message containing a sequence identifier is an email with a missing sequence identifier in a header line, such as "X-Sequence-Lost: XXX, YYY," wherein XXX refers to a sequence identifier for a missing message and YYY refers to a recipient messaging address. In some embodiments, additional messages may be sent if lost message(s) are not received, for example by doubling the time between each resend request, with an optional cap on the limit of the amount of time to wait between resends, or on the number of resend messages to send. In some embodiments, a resend request may include an alternate email address for the recipient, which may for example be used if the lost message(s) bounced. In some embodiments, a communication may be initiated with a trusted third party, for example a third party that is likely able to communicate with the correspondent, informing the third party of missing message(s). In some embodiments, an out-of-band notification such as a TCP/IP connection over a network such as the internet may be made to inform a sender or third party that one or more messages have not been received.

Figure 25:
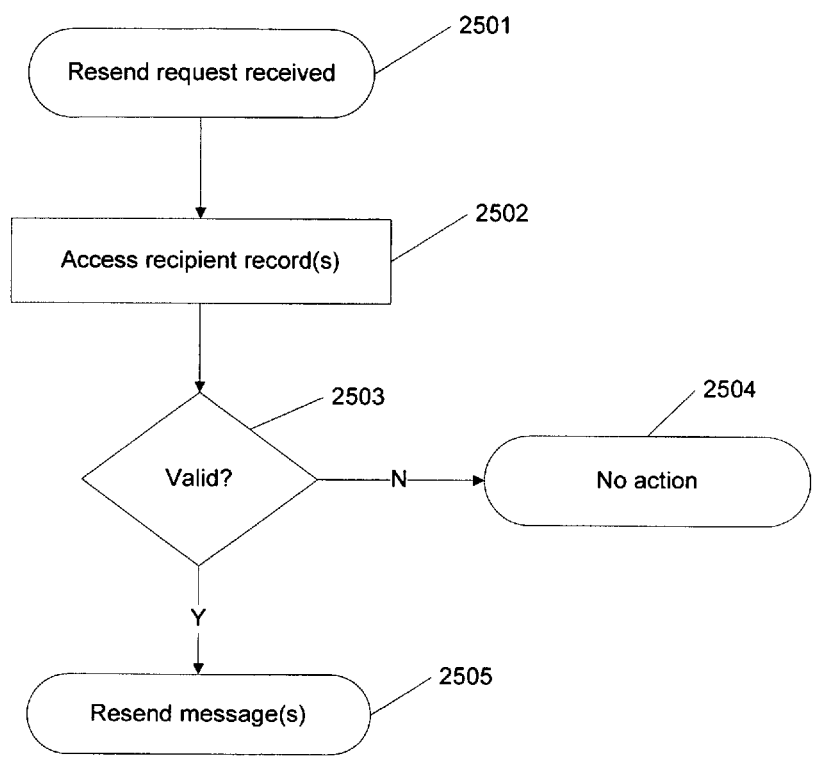
FIG. 25 is a flow diagram of a method for responding to a resend request, according to some embodiments.

FIG. 25 is a flow diagram of a method for responding to a resend request, according to some embodiments. In this example, a resend request is received (2501), for example a resend message sent as described in conjunction with 2407 of FIG. 24. In some embodiments, a resend request may include a messaging address of a recipient, and one or more missing message sequence identifiers. In an example for an email message, an email may contain a header line such as "X-Sequence-Lost: XXX, YYY," wherein XXX is a missing message sequence identifier, and YYY is an email address of the recipient. Recipient records may be accessed (2502). An example of accessing recipient records is to determine outgoing messages with associated outgoing sequence identifiers associated with the recipient. If the resend request is determined not to be valid (2503), then no action is taken in this example (2504). Examples of determining that a resend request is not valid include determining that no messages were sent to the recipient, or that messages with the specified missing message sequence identifier(s) were not sent, or that records were not kept or have been discarded.

If the resend request is determined to be valid (2503), then one or more missing messages may be resent in this example (25045). An example of resending one or more missing messages is to send retained outgoing message(s) whose associated outgoing message sequence identifier(s) match the reported missing message(s). In some embodiments, resending a message may include sending the message to a different address than the address to which it was initially sent, for example an alternate address contained in the resend request.

Figure 26:
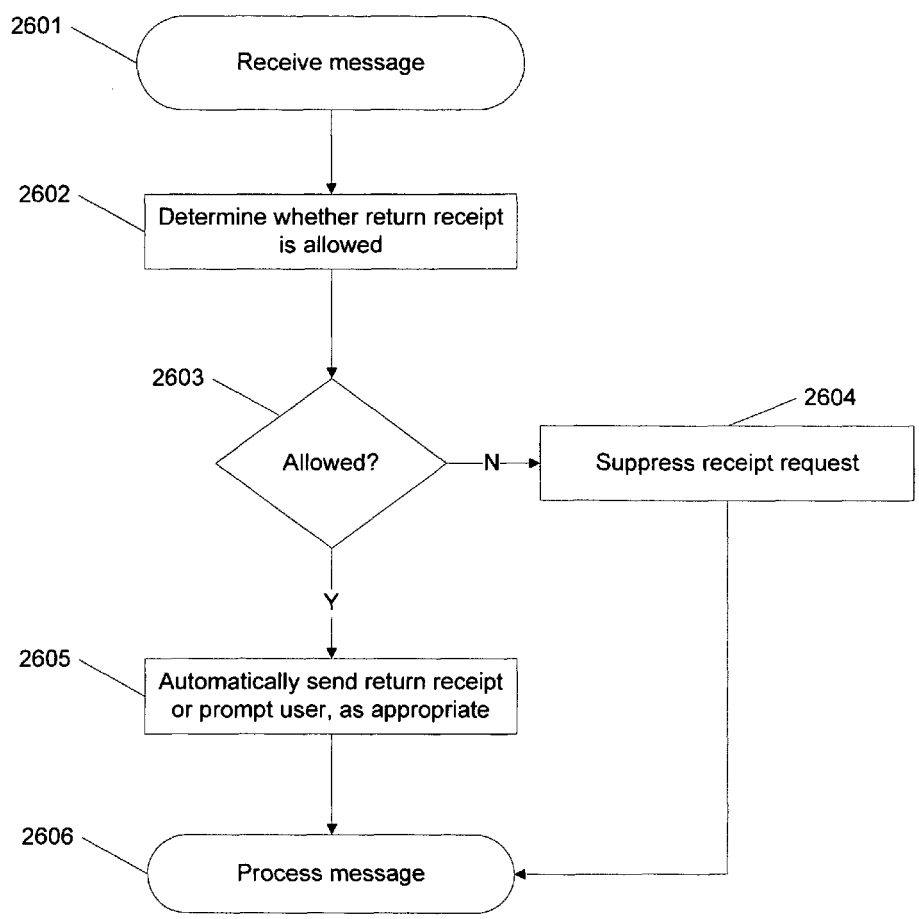
FIG. 26 is a flow diagram of a method for controlling incoming requests for return receipts, according to some embodiments.

FIG. 26 is a flow diagram of a method for controlling incoming requests for return receipts, according to some embodiments. In this example, a message is received in which a request for a return receipt is contained (2601), for example by a messaging client or server or proxy layer. An example of a request for a read receipt is a header marked "Disposition-Notification-To: XXX," wherein XXX is a messaging address for the message sender. It may be determined whether a return receipt is allowed (2602). In some embodiments, determination of whether a return receipt is allowed may be done on a per-correspondent or per-group basis. In one example, an entry in an electronic address book associated with the sender of a message may indicate whether requests for a return receipt are to be honored. In another example, a group to which the sender of the message belongs may have associated information indicating whether requests for a return receipt from group members are to be honored. In some embodiments, behavior regarding sending return receipts may include a category of sender for whom return receipts should always be sent automatically. In some embodiments, behavior regarding sending return receipts may include a category of sender for whom return receipts should never be sent, or passed along to the recipient user. In some embodiments, behavior regarding return receipts may include a category of sender for whom the recipient user should be prompted to decide behavior on a case-by-base basis. In some embodiments, behavior regarding return receipts may be inferred from the presence of a sender in accordance with the content of electronic databases containing messaging addresses. For example, a sender in a recipient's whitelist, or in a recipient's address book, may be allowed to request return receipts or to automatically receive return receipts, while a sender not contained in such databases may automatically be denied return receipts, or may be subject to manual approval prior to sending return receipts.

If return receipts are not allowed for the sender (2603), then the request for a return receipt may be suppressed (2604), for example by not displaying a dialog asking whether a return receipt should be sent, and not automatically sending a return receipt. The message may then be further processed (2606), for example by adding it to an inbox.

If return receipts are allowed for the sender (2604), then the request may be processed according to settings (2605). An example of processing the request according to settings is to present a dialog box to a user and allow the user to determine how to handle return receipts for the message sender (for example, by sending for the particular message, by always sending, or by never sending). Another example of processing the request according to settings is to automatically send a return receipt. The message may then be further processed (2606), for example by adding it to an inbox.

Figure 27:
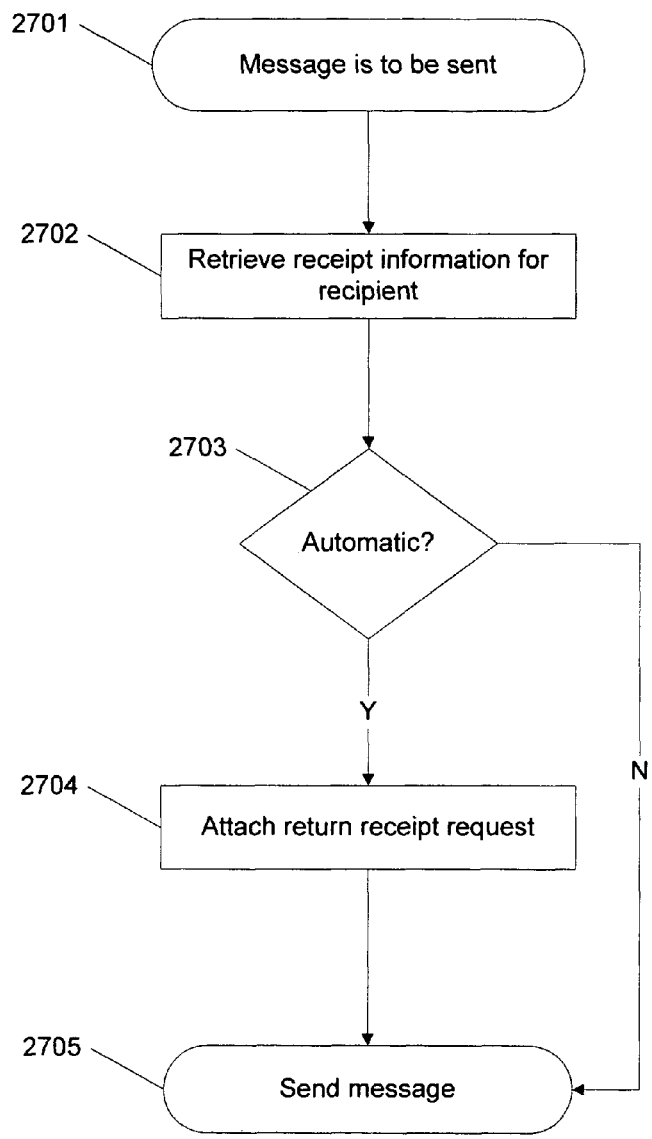
FIG. 27 is a flow diagram of a method for controlling outgoing requests for return receipts, according to some embodiments.

FIG. 27 is a flow diagram of a method for controlling outgoing requests for return receipts, according to some embodiments. In this example, a message is to be sent (2701), for example because a user has selected to send the message or because the message has been generated and submitted by an application. Return receipt information associated with the sender, or with a group to which the sender belongs, may be retrieved (2702). In some embodiments, return receipt requesting information may be kept on a per-correspondent or per-group basis, for example in a database such as an electronic address book. If the return receipt information indicates that a return receipt should be automatically requested (2703), then a return receipt request may be included with the message (2704). An example of including a return receipt request for a message is to include a header line beginning with "Disposition-Notification-To: XXX," wherein XXX is an email address associated with the sender. In some embodiments, a message identifier associated with the message for which a return receipt is being sent may be included in the return receipt. In some embodiments, a message characterization such as a hash of contents of the message for which a return receipt is being sent may be calculated and included in the return receipt. The message may be sent (2705).

Figure 28:
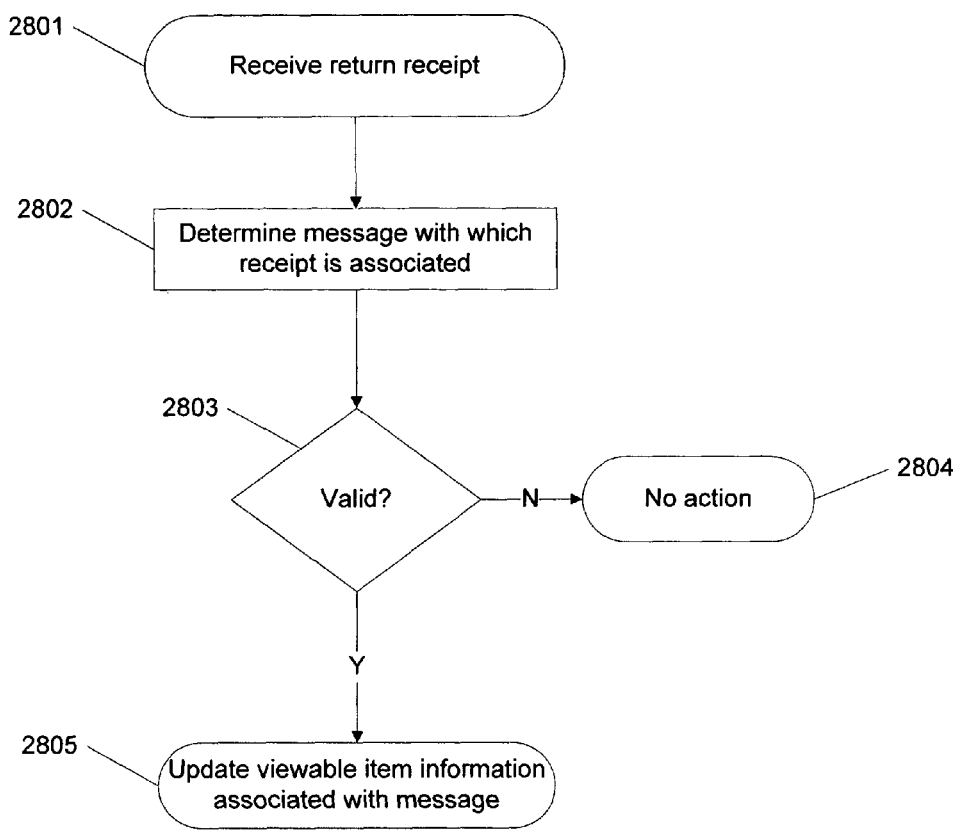
FIG. 28 is a flow diagram of a method for displaying return receipt information, according to some embodiments.

FIG. 28 is a flow diagram of a method for displaying return receipt information, according to some embodiments. In this example, a return receipt is received (2801), for example a return receipt sent as described in conjunction with FIG. 27. An example of a return receipt is an email message in which a header line specifies a "Content-Type" of "multipart/report" and a "report-type" of "disposition-notify." In some embodiments, a return receipt may include querying for information from a central server, for example an AOL server with knowledge of whether a message has been received, read or deleted. A message may be determined for which the return receipt is associated (2802). An example of determining a message with which the return receipt is associated is to check one or more message identifiers associated with outgoing messages to determine a message that corresponds to a message identifier associated with the return receipt. An example of a way that a message identifier may be associated with a return receipt is in a "References" field of an email header. Another example of determining a message with which the return receipt is associated is to determine a message sent to the sender of the return receipt, for which a return receipt was requested. Another example of determining a message with which the return receipt is associated is to check a message characterization such as a hash against one or more hashes calculated from outgoing messages to determine a match. If the return receipt is not valid (2803), for example if it does not contain a message identifier associated with a sent message, then no action is taken in this example (2804). If the return receipt is valid (2803), then viewable item information associated with the message to which the return receipt refers may be updated (2805). An example of updating information is to mark the message as having been received and/or read in accordance with information associated with the return receipt, so a subsequent view of the message, for example in a "sent messages" folder, includes a visual indication that the message has been received and/or read. In some embodiments, detailed information may be available, for example information indicating whether a message has been received, read, and/or deleted. In some embodiments, a report may be presented to a user, for example a list of message for which a return receipt was requested during a predetermined period of time, indicating messages that were not received and/or read. In some embodiments, a list of messages, such as messages in a sent folder, may be sorted (as a primary or later sort key) based on their receipt status. For example, it may be possible to sort all messages that have not been acknowledged via some return receipt mechanisms to the top of a viewable list, and such a list may be further sorted based on one or more secondary keys, such as sorted by date.

Figure 29:
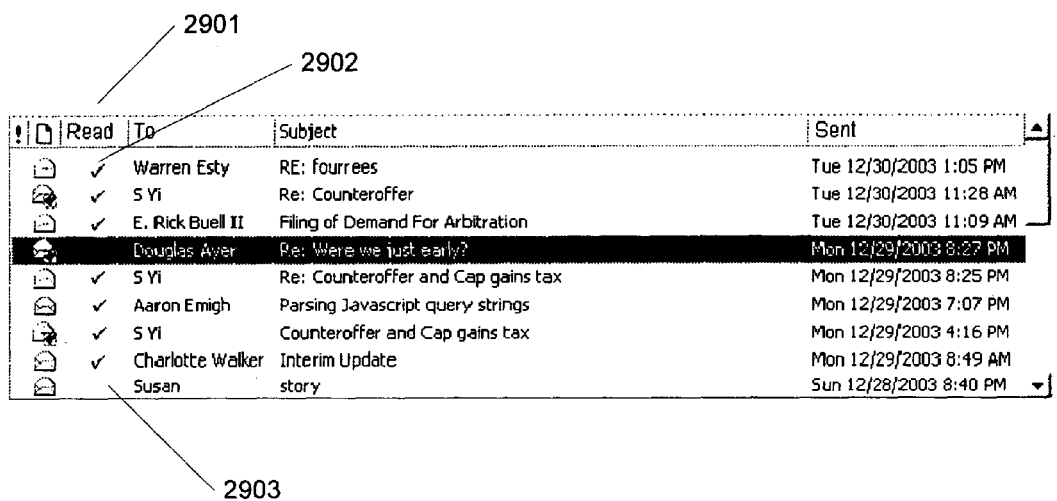
FIG. 29 is an example of a display indicating return receipt status, according to some embodiments.

FIG. 29 is an example of a display indicating return receipt status, according to some embodiments. The illustrative example of FIG. 29 could, for example, be generated using viewable item information including information about return receipt status, as described in conjunction with FIG. 28. In this example, an outgoing email spool such as a "sent messages" folder is being viewed. A field 2901 indicates the return status of messages, wherein each row is associated with a message. In this example, a check mark 2902 indicates that a return receipt was received for a message, and the absence of a check mark 2903 indicates that no return receipt has been received for the message. In some embodiments, more detail may be shown, for example different status indications for messages that have been received, read, forwarded, replied to and/or deleted.

Figure 30:
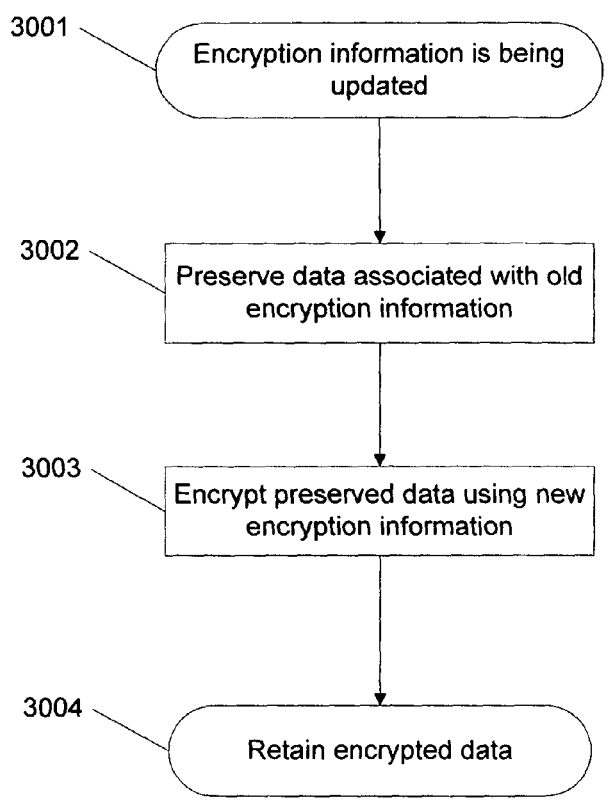
FIG. 30 is a flow diagram of a method for retaining encrypted information, according to some embodiments.

FIG. 30 is a flow diagram of a method for retaining encrypted information, according to some embodiments. In this example, encryption information is being updated (3001). An example of encryption information being updated is when a key used to decrypt data, or to verify a cryptographic signature associated with data, is being changed. In this example, a key refers to any cryptographic token used to decode or authenticate information, such as a public or private half of a public/private key pair, or a key used in a symmetric encryption algorithm such as DES, AES or Blowfish. Old encryption information refers herein to encryption information that is being updated, and new encryption information refers herein to updated encryption information such as a new key associated with a user. Data associated with the old encryption information may be preserved (3002). An example of data associated with old encryption information is data encrypted using a key that is being superseded. Another example of data associated with old encryption information is data signed using a key that is being superseded. In some embodiments, data may refer herein to messages, for example incoming and/or outgoing messages such as S/MIME encrypted and/or signed emails. An example of preserving data is to decrypt the data, for example using the old encryption information. Another example of preserving data is to associate old encryption information with the data, for example associating a key that may be used to decrypt and/or authenticate data such as a message along with the encrypted and/or authenticated data. In some embodiments, data may be preserved on a file granularity, for example by preserving individual files. In some embodiments, data may be preserved in a finer granularity. An example of preserving data with finer granularity is to process messages in a data repository such as a folder or archive file, wherein messages are preserved differently based on information associated with the messages. For example, an unsigned message encrypted with an old key may be decrypted; a message signed using an old key may be associated with the old key; and an unencrypted message, or a message encrypted and/or signed with a key that is not being updated, may not be modified in this example.

Preserved data may be encrypted using new encryption information (3003). An example of encrypting preserved data using new encryption information is to encrypt decrypted data using the new encryption information. Another example of encrypting preserved data using new encryption information is to encrypt data with an associated old key using the new encryption information. The encrypted data may be retained (3004), for example by storing in a file, folder or archive.

Figure 31:
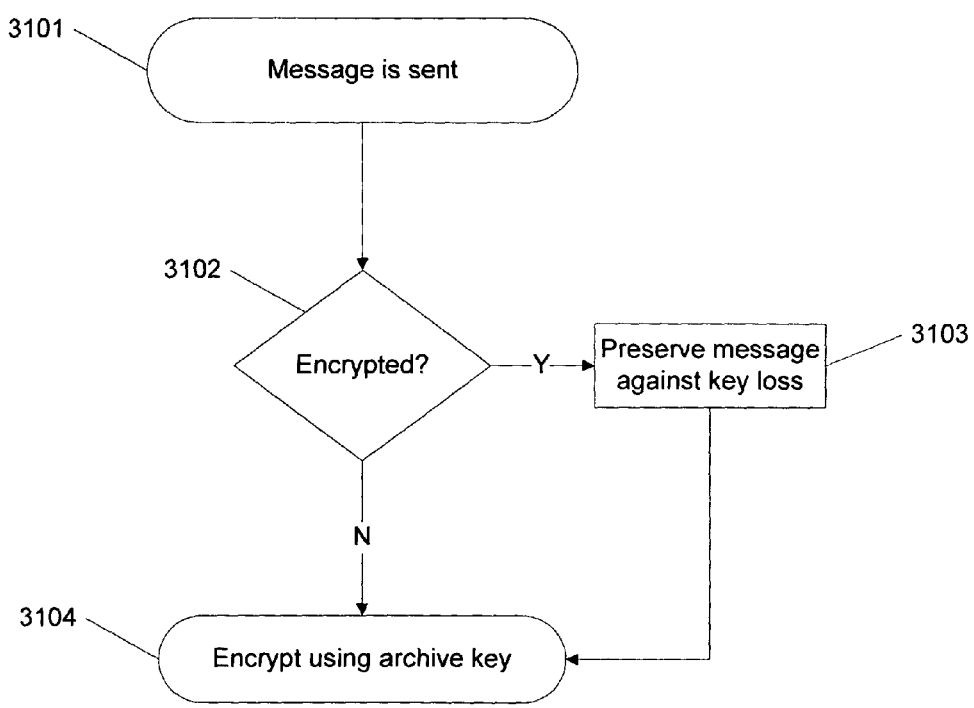
FIG. 31 is a flow diagram of a method for secure retention of sent messages, according to some embodiments.

FIG. 31 is a flow diagram of a method for secure retention of sent messages, according to some embodiments. In this example, a message is to be sent, or has been sent (3101). It is determined whether the message is encrypted (3102). An example of an encrypted message is an email encrypted using S/MIME. If the message is encrypted, it may be preserved against key loss (3103). One example of preserving a message against key loss is to decrypt the message, or use the plaintext message that was encrypted before sending. Another example of preserving a message against key loss is to associate a key with the message, for example a key capable of decrypting and/or authenticating the message. The message may be encrypted using an archive key (3104). An example of an archive key is a key that is not subject to change, is relatively infrequently subject to change, or is subject to change on a different interval or basis than a key used to encrypt outgoing messages transmitted to one or more recipients. Another example of an archive key is a key that is used to encrypt all outgoing messages, substantially all outgoing messages, or a coherent group of outgoing messages such as outgoing messages associated with a predetermined folder or archive. In some embodiments, if an archive key changes, the technique described in conjunction with FIG. 30 is applied to manage the key update in this example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for updating a whitelist, comprising:
   receiving a change of address directive;
   wherein the change of address directive includes a new address;
   determining whether the change of address directive is authentic; and
   adding the new address to the whitelist, if it is determined that the change of address directive is authentic.

2. The method of claim 1, wherein the change of address directive is associated with an email.

3. The method of claim 1, further comprising removing an old address from the whitelist.

4. The method of claim 3, wherein the change of address directive includes the old address.

5. The method of claim 1, wherein the new address is a hash of a second address.

6. The method of claim 1, wherein determining whether the change of address directive is authentic includes determining whether the change of address directive is associated with an authorized change-of-address authority.

7. The method of claim 1, wherein the change of address directive includes a token, and wherein determining whether the change of address directive is authentic includes determining whether the token matches a stored token.

8. The method of claim 7, wherein the change of address directive is associated with an old email address, and wherein the stored token is associated with the old email address.

9. The method of claim 1, wherein determining whether the change of address directive is authentic includes verifying a cryptographic signature.

10. The method of claim 1, wherein determining whether the change of address directive is authentic includes verifying an email sender, wherein the email sender is associated with the change of address directive.

11. A system for updating a whitelist, comprising:
a processor configured to:
receive a change of address directive;
wherein the change of address directive includes a new address;
determine whether the change of address directive is authentic; and
add the new address to the whitelist, if it is determined that the change of address directive is authentic; and
a memory coupled with the processor, wherein the memory provides instructions to the processor.

12. The system of claim 11, wherein the change of address directive is associated with an email.

13. The system of claim 11, wherein determining whether the change of address directive is authentic includes determining whether the change of address directive is associated with an authorized change-of-address authority.

14. The system of claim 11, wherein the change of address directive includes a token, and wherein determining whether the change of address directive is authentic includes determining whether the token matches a stored token.

15. The system of claim 11, wherein determining whether the change of address directive is authentic includes verifying a cryptographic signature.

16. A computer program product for updating a whitelist, the computer program product being embodied in a computer readable medium and comprising computer instructions for:
receiving a change of address directive;
wherein the change of address directive includes a new address;
determining whether the change of address directive is authentic; and
adding the new address to the whitelist, if it is determined that the change of address directive is authentic.

17. The computer program product of claim 16, wherein the change of address directive is associated with an email.

18. The computer program product of claim 16, wherein determining whether the change of address directive is authentic includes determining whether the change of address directive is associated with an authorized change-of-address authority.

19. The computer program product of claim 16, wherein the change of address directive includes a token, and wherein determining whether the change of address directive is authentic includes determining whether the token matches a stored token.

20. The computer program product of claim 16, wherein determining whether the change of address directive is authentic includes verifying an email sender, wherein the email sender is associated with the change of address directive.

* * * * *